(12) United States Patent
Kambayashi et al.

(10) Patent No.: US 6,208,801 B1
(45) Date of Patent: Mar. 27, 2001

(54) INFORMATION REPRODUCING APPARATUS AND INFORMATION RECORDING MEDIUM FOR USE IN THE INFORMATION REPRODUCING APPARATUS

(75) Inventors: Toru Kambayashi, Chigasaki; Hiroyuki Mizutani, Yokohama, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 08/921,354

(22) Filed: Aug. 29, 1997

(30) Foreign Application Priority Data

Aug. 30, 1996 (JP) .................................................. 8-230612

(51) Int. Cl.$^7$ ....................... H04N 5/7617; H04N 5/761; H04N 5/913
(52) U.S. Cl. .................................. 386/95; 386/94; 386/83
(58) Field of Search .................................. 386/95, 94, 46, 386/83, 1, 52, 125, 126, 124, 4, 109, 111, 112; 360/60, 15, 13; H04N 5/7617, 5/761, 5/913

(56) References Cited

U.S. PATENT DOCUMENTS 5,541,738 * 7/1996 Mankovitz ............................. 386/83
5,703,997 * 12/1997 Kitamura et al. ...................... 386/97

FOREIGN PATENT DOCUMENTS 5-174450  7/1993 (JP) .

* cited by examiner

Primary Examiner—Robert Chevalier
(74) Attorney, Agent, or Firm—Oblon, Spivak, McClelland, Maier & Neustadt, P.C.

(57) ABSTRACT

An information reproducing apparatus according to the present invention includes an information reading unit for reading main information, sub-information and a control code from an information recording medium on which main information, sub-information and the control code for distinguishing main information and sub-information from each other have been recorded, and a reproducing unit for reproducing main information and sub-information read by the information reading unit so that fast forward movement of sub-information is inhibited in a case where sub-information is being reproduced by the reproducing unit.

31 Claims, 33 Drawing Sheets

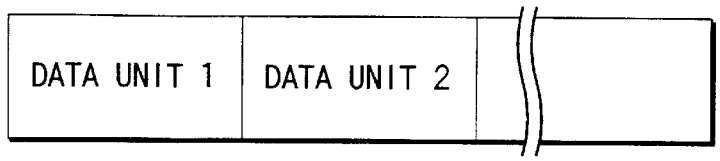
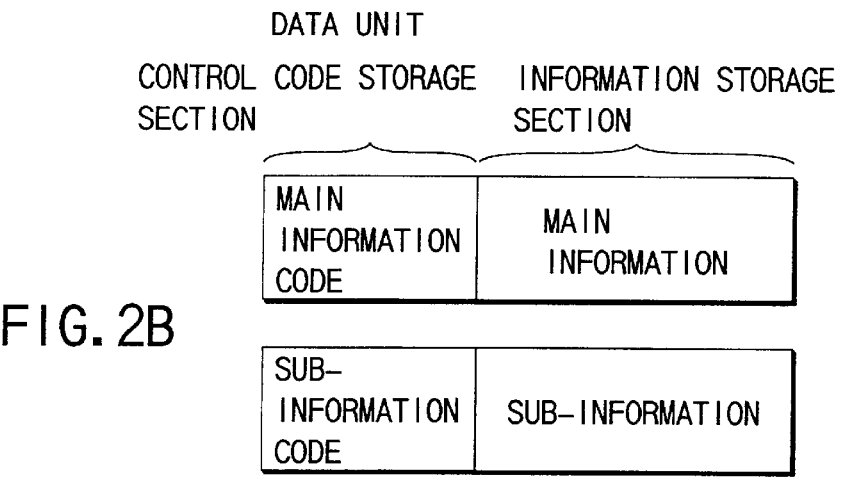
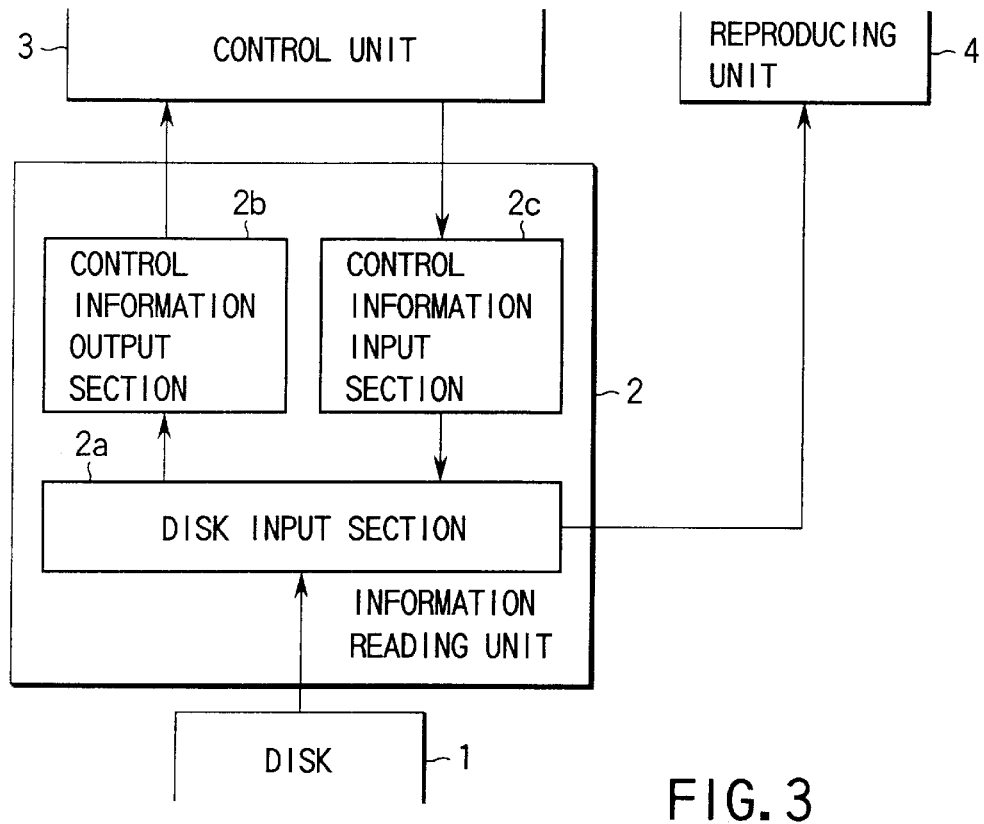

FORMAT OF RECORD

MAIN INFORMATION

SUB-INFORMATION

CC: CONTROL CODE

MAIN INFORMATION A

TITLE 1 ———— PRESENTED BY A CORPORATION AND B CORPORATION

TITLE 2 ———— PRESENTED BY C CORPORATION

TITLE 3 ———— PRESENTED BY B CORPORATION

FIG. 11

FORMAT OF RECORD

DATA UNIT

| CONTROL CODE STORAGE SECTION | INFORMATION STORAGE SECTION |
|---|---|
| MAIN INFORMATION CODE | MAIN INFORMATION |
| SUB-INFORMATION CODE | SUB-INFORMATION |
| NETWORK SERVER REFERENCE CODE | |

FORMAT OF RECORD

DATA UNIT

FORMAT OF DATA OF INFORMATION OF BROADCAST

INFORMATION REPRODUCING APPARATUS AND INFORMATION RECORDING MEDIUM FOR USE IN THE INFORMATION REPRODUCING APPARATUS

BACKGROUND OF THE INVENTION

The present invention relates to an information reproducing apparatus for reading and reproducing information from an information recording medium, such as a DVD, and to an information recording medium for use in the information reproducing apparatus.

Recently, a DVD system has attracted attention as the key of the multimedia period. The DVD (Digital Versatile Disc) system, which is capable of recording/reproducing high quality image, audio and computer data on the broadcast level, is a multimedia recording/reproducing system expected to widely be applied to a multiplicity of fields including movies, music, games, computers and the like.

The DVD system, which is capable of reproducing the atmosphere of a movie theater because of the high quality image on the broadcast level and multichannel sound, is greatly expected to personally be used. To realize this, a variety conditions must be satisfied.

The most important factor is the price of the DVD system, which permits the system to be widely used. The manufacturing easiness and IC techniques must be considered to satisfactorily reduce the cost of the DVD system.

To reduce the cost of the DVD system, it might be feasible to record, on the DVD, sub-information, such as commercial information from an advertiser, in such a manner that the commercial is inserted into main information, such as a movie. However, simple insertion and recording of sub-information on main information has a problem in that sub-information can easily be skipped (by instructing fast forward movement) by a user when the reproduction of the commercial has been started and thus sub-information cannot reliably be presented to the user.

BRIEF SUMMARY OF THE INVENTION

Accordingly, an object of the present invention is to provide an information reproducing apparatus capable of reliably presenting important sub-information (for example, a commercial) for supplementing main information, such as a movie, recorded on an information recording medium or important information relating to a main sponsor when the information recording medium, such as a DVD, is reproduced whereby greatly contributing to wide use of the DVD system.

To achieve the above-mentioned object, according to one aspect of the present invention, there is provided an information reproducing apparatus comprising:

reading means for reading main information, sub-information and a control code from an information recording medium on which the main information, the sub-information and the control code for distinguishing the main information and the sub-information from each other have been recorded;

reproducing means for reproducing the main information and sub-information read by the reading means; and first inhibition means for inhibiting an interruption of sub-information reproduction by the reproducing means.

According to a second aspect of the present invention, the information reproducing apparatus according to the first aspect has a structure such that the information recording medium is a DVD.

According to a third aspect of the present invention, the information reproducing apparatus according to the first aspect has a structure such that the first inhibition means comprises:
    determination means for determining whether or not the control code read by the reading means indicates the sub-information;
    first setting means for setting a skip flag to be a first value in a case where the determination means has determined that the control code indicates the sub-information; and
    second inhibition means for inhibiting an interruption of sub-information reproduction in a case where the skip flag has been set to be the first value by the first setting means.

According to a fourth aspect of the present invention, there is provided the information reproducing apparatus according to the third aspect further comprising:

second setting means for setting the skip flag to be a second value in a case where the determining means has determined that the control code indicates main information; and means for fast-forward-moving main information which is being reproduced by the reproducing means in a case where fast forward movement has been instructed by a user and the skip flag has been set to be the second value by the second setting means.

According to a fifth aspect of the present invention, the information reproducing apparatus according to the first aspect has a structure such that main information is information of described contents of a movie, and sub-information is information of described commercial from a sponsor of the movie.

The information reproducing apparatuses according to the first to fifth aspects enable instruction of fast forward movement of sub-information from a user to be ignored. Thus, important sub-information for supplementing main information or important information relating a main sponsor can reliably be presented to a user.

According to a sixth aspect of the present invention, there is provided a first storage medium having program code instructions stored thereon when executed by a processor, the instructions comprising:

means for causing the processor to read main information, sub-information and a control code from a second storage medium on which the main information, the sub-information and the control code for distinguishing the main information and the sub-information from each other have been recorded;

means for causing the processor to reproduce read main information and sub-information; and means for causing the processor to inhibit an interruption of sub-information reproduction in a case where the sub-information is being reproduced.

According to a seventh aspect of the present invention, there is provided an information reproducing apparatus comprising:

reading means for reading main information, sub-information and control information from an information recording medium on which the main information, the sub-information and the control information including a condition under which reproduction of sub-information is started and a condition under which reproduction of sub-information is ended have been recorded;

first reproduction means for reproducing the main information read by the reading means;

recording means for recording the control information read by the reading means;

first determination means for determining whether or not the main information which is reproduced by the first reproducing means or contents of instruction from a user are adaptable to the condition under which reproduction of the sub-information is started; and second reproducing means for reproducing the sub-information read by the reading means in a case where the first determination means has determined that the main information or the contents are adaptable to the condition under which reproduction of the sub-information is started.

According to an eighth aspect of the present invention, there is provided the information reproducing apparatus according to the seventh aspect further comprising:

second determination means for determining whether or not the condition under which reproduction of sub-information recorded by the recording means is ended is satisfied during reproduction of sub-information by the second reproduction means; and means for ending reproduction of sub-information by the second reproduction means in a case where the second determination means has determined that the condition under which reproduction of sub-information is ended is satisfied.

According to a ninth aspect of the present invention, there is provided the information reproducing apparatus according to the eighth aspect having a structure such that the condition under which reproduction of sub-information is ended is time elapsed by a predetermined period of time after reproduction of sub-information has been started by the second reproducing means.

According to a tenth aspect of the present invention, the information reproducing apparatus according to the seventh aspect has a structure such that the information recording medium is a DVD.

According to an eleventh aspect of the present invention, the information reproducing apparatus according to the seventh aspect has a structure such that main information is information of described contents of a movie, and sub-information is information of a described commercial of a sponsor of the movie.

According to a twelfth aspect of the present invention, there is provided the information reproducing apparatus according to the seventh aspect further comprising inhibition means for inhibiting an interruption of sub-information reproduction in a case where sub-information is being reproduced by the second reproducing means.

The information reproducing apparatuses according to the seventh to twelfth aspects have the structure such that sub-information is reproduced in accordance with the condition under which reproduction of sub-information is started and the condition under which reproduction is ended. Therefore, sub-information can be presented at an arbitrary timing.

According to a thirteenth aspect of the present invention, there is provided a first storage medium having program code instructions stored thereon when executed by a processor, the instructions comprising:

means for causing the processor to read main information, sub-information and control information from a second medium on which the main information, the sub-information and the control information including a condition under which reproduction of sub-information is started and a condition under which reproduction is ended have been recorded;

means for causing the processor to reproduce read main information;

means for causing the processor to record read control information;

means for causing the processor to determine whether or not the main information which is reproduced or contents of instruction from a user are adaptable to the condition, of recorded control information, under which reproduction of sub-information is started; and means for causing the processor to reproduce read sub-information in a case where the main information or the contents are adaptable to the condition under which reproduction of sub-information is started.

According to a fourteenth aspect of the present invention, the first storage medium according to the thirteenth aspect has a structure such that the instructions further comprise:

means for causing the process to determine whether or not the condition under which reproduction of recorded sub-information is ended is satisfied during reproduction of sub-information; and means for causing the processor to end reproduction of sub-information in a case where a determination has been performed that the condition under which reproduction of sub-information is ended is satisfied.

According to a fifteenth aspect of the present invention, there is provided an information reproducing apparatus comprising:

reading means for reading main information, sub-information, network reference information and a control code from an information recording medium on which the main information, the sub-information, the network reference information indicating a network server, to which an access is made, and which indicates whether or not main information and network information are combined with each other and whether or not sub-information and network information are combined with each other, and the control code for distinguishing the main information, the sub-information and the network reference information, have been recorded;

acquiring means for acquiring network information from the network server in accordance with the network reference information read by the reading means;

first combining means for combining network information acquired by the acquiring means and the sub-information read by the reading means with each other in a case where the network reference information read by the reading means indicates that the sub-information and the network information are combined with each other; and first reproducing means for reproducing information combined by the first combining means.

According to a sixteenth aspect of the present invention, there is provided the information reproducing apparatus according to the fifteenth aspect further comprising:

second combining means for combining the network information acquired by the acquiring means and the main information acquired by the reading means with each other in a case where the network reference information read by the reading means indicates that the main information and the network information are combined with each other; and second reproducing means for reproducing information combined by the second combining means.

According to a seventeenth aspect of the present invention, the information reproducing apparatus according to the fifteenth aspect has a structure such that the information recording medium is a DVD.

According to an eighteenth aspect of the present invention, there is provided the information reproducing apparatus according to the fifteenth aspect further comprising:

inhibition means for inhibiting an interruption of combined information reproduction in a case where combined information is being reproduced by the first reproducing means.

According to a nineteenth aspect of the present invention, the information reproducing apparatus according to the fifteenth aspect has a structure such that network information comprises a server changing code with which change of a server, to which an access is made, is instructed and address of a server to which a new access is made, and the information reproducing apparatus further comprises server changing means for changing data indicating the server to which access is made and included in the network reference information in accordance with the network information.

According to a twentieth aspect of the present invention, the information reproducing apparatus according to the fifteenth aspect has a structure such that main information is information of described contents of a movie, and sub-information is information of described commercial from a sponsor of the movie.

The information reproducing apparatuses according to the fifteenth to twentieth aspects have the structure such that network reference information acquired from the network server and sub-information are combined with each other and combined information is reproduced. Therefore, sub-information containing up-to-date contents can be displayed.

According to a twenty-first aspect of the present invention, there is provided a first storage medium having program code instructions stored thereon when executed by a processor, the instructions comprising:

means for causing the processor to read main information, sub-information, network reference information and a control code from a second storage medium on which main information, sub-information, network reference information indicating main information and a network server to which an access is made and indicating whether or not main information and network information are combined with each other and whether or not sub-information and network information are combined with each other and the control code for identifying main information, sub-information and network reference information from one another are recorded;

means for causing the processor to acquire network information from the network server in accordance with read network reference information;

means for causing the processor to combine acquired network information and read sub-information with each other in a case where read network reference information indicates that sub-information and network information are combined with each other; and means for causing the processor to reproduce combined information.

According to a twenty-second aspect of the present invention, there is provided an information reproducing apparatus comprising:

reading means for reading main information, sub-information, receiving program information, and a control code from an information recording medium on which the main information, the sub-information, the receiving program information which indicates a program to be received and with which the program which is received is specified and a control code for distinguishing the main information, the sub-information and the receiving program information from one another are recorded;

receiving means for receiving broadcast program information;

selection means for selecting the broadcast program information received by the receiving means in accordance with the receiving program information read by the reading means;

first determining means for determining whether or not the sub-information read by the reading means includes a broadcast information reference code; and first reproducing means for reproducing the broadcast program information selected by the selection means in a case where the first determining means has determined that the sub-information includes the broadcast information reference code.

According to a twenty-third aspect of the present invention, there is provided the information reproducing apparatus according to the twenty-second aspect further comprising:

second reproducing means for reproducing sub-information read by the reading means in a case where the first determining means has determined that sub-information does not include the broadcast information reference code.

According to a twenty-fourth aspect of the present invention, there is provided the information reproducing apparatus according to the twenty-second aspect further comprising:

second reproducing means for reproducing the sub-information read by the reading means;

second determining means for determining whether or not the control code read by the reading means indicates the sub-information; and inhibition means for inhibiting an interruption of sub-information reproduction reproduced by the second reproducing means in a case where the second determining means has determined that the control code indicates the sub-information.

According to a twenty-fifth aspect of the present invention, the information reproducing apparatus according to the twenty-second aspect has a structure such that the information recording medium is a DVD.

According to a twenty-sixth aspect of the present invention, the information reproducing apparatus according to the twenty-second aspect has a structure such that main information is information of described contents of a movie, and sub-information is information of described commercial from a sponsor of the movie.

The information reproducing apparatuses according to the twenty-second to twenty-sixth aspects have the structure such that broadcast program information, which has been selected, is reproduced in the case where broadcast information reference code is included in sub-information. Therefore, up-to-date contents can be displayed.

According to a twenty-seventh aspect of the present invention, there is provided a first storage medium having program code instructions stored thereon when executed by a processor, the instructions comprising:

means for causing the processor to read main information, sub-information, receiving program information and a control code from an information recording medium on which the main information, the sub-information, the receiving program information which indicates a program to be received and with which the program which is received is specified and the control code for distinguishing the main information, the sub-information and the receiving program information from one another have been recorded;

means for causing the processor to select broadcast program information in accordance with read receiving program information;

means for causing the processor to determine whether read sub-information includes a broadcast information reference code; and means for causing the processor to reproduce selecting broadcast program information in a case where a determination has been performed that the sub-information includes the broadcast information reference code.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a diagram showing the format of a record in the information recording medium;

FIG. 2B is a diagram showing data units in the information recording medium;

FIG. 3 is a block diagram showing an information reading unit;

FIG. 11 is a diagram showing an example of display screen of a GUI when a disk has been loaded;

DETAILED DESCRIPTION OF THE INVENTION

Embodiments of the present invention will now be described with reference to the drawings.

First Embodiment

Figure 1:
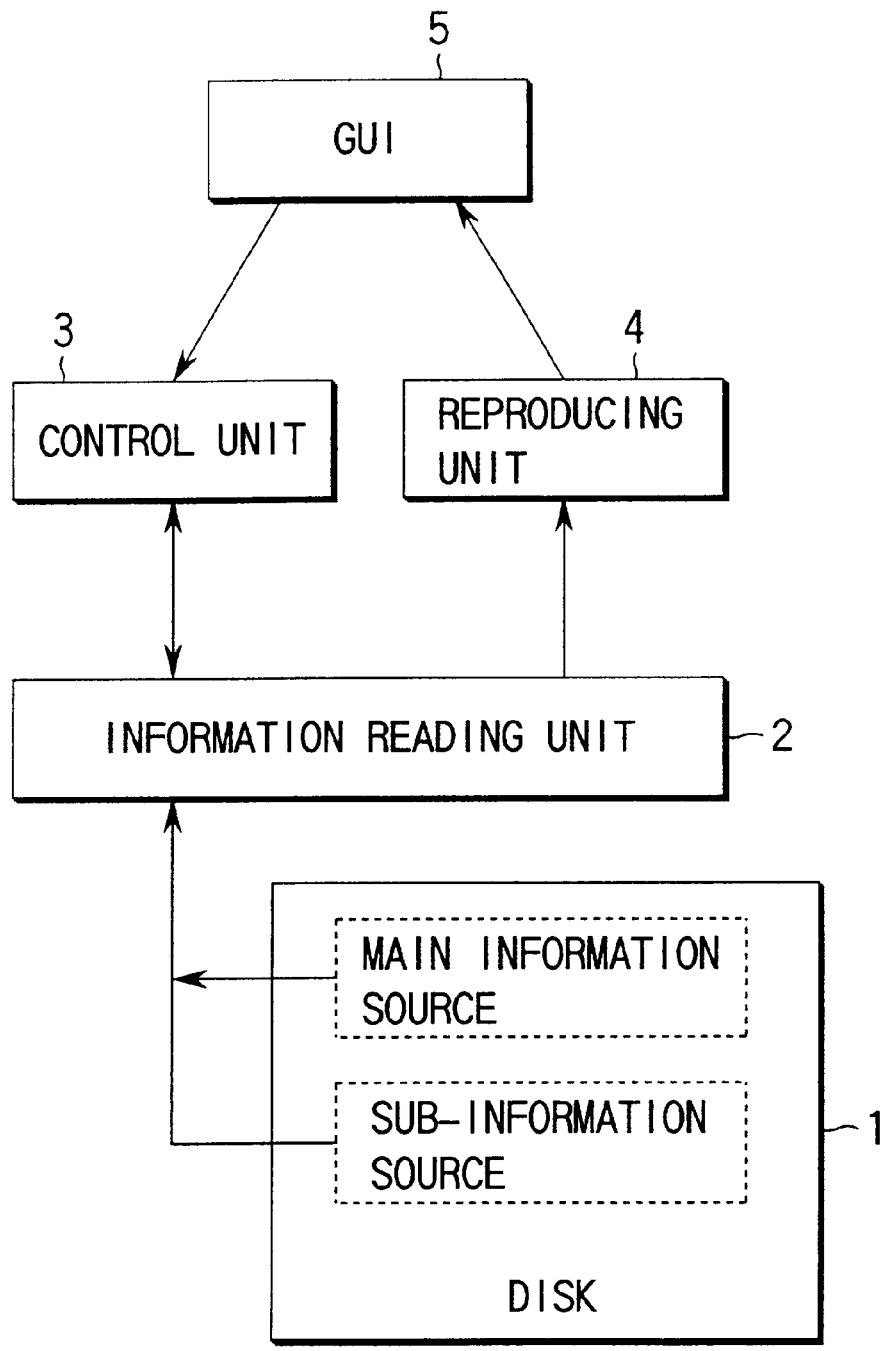
FIG. 1 is a block diagram showing an information reproducing apparatus according to a first embodiment of the present invention.

FIG. 1 is a diagram showing an information reproducing apparatus according to a first embodiment of the present invention.

Referring to FIG. 1, an information recording medium (hereinafter sometimes also called a "disk") 1, such as a DVD or CD-ROM, having a main information source and a sub-information source, is arranged to be loaded into an information reading unit 2.

The format of record of information in the information recording medium 1 is, as shown in FIG. 2A, composed of data units each having a predetermined length. As shown in FIG. 2B, the data units are classified into two types which are data units each having main information stored therein and data units each having sub-information stored therein.

Each data unit is composed of a control code storage section in which a control code for distinguishing main information and sub-information from each other; and an information storage section for storing main information data or sub-information data in such a manner that data has a predetermined length.

Main information is information of description of the contents of, for example, a movie, while sub-information is information of description of, for example, a commercial from a sponsor of the movie.

When the information reading unit 2 has read information in each data unit from the information recording medium 1, the information reading unit 2 transfers the code included in the data unit to the control unit 3.

In accordance with the control code transferred from the information reading unit 2 and the contents of an instruction issued from a user and transferred through the GUI, the control unit 3 controls reproduction of main information and sub-information.

The reproducing unit 4 reproduces main information or sub-information transferred from the information reading unit 2 to follow the control performed by the control unit 3, reproduced information being displayed on the GUI 5.

FIG. 3 is a block diagram showing the information reading unit 2 which comprises a disk input section 2a, a control information output section 2b and a control information input section 2c.

The disk 1 is injected into the disk input section 2a so that information in each data unit is read from the disk 1 by reading head or the like.

The control code read by the disk input section 2a and included in the data unit is transferred to the control information output section 2b, and then output to the control unit 3.

A variety of control instruction information items (signals) output from the control unit 3 are arranged to be supplied to the control information input section 2c.

Figure 4:
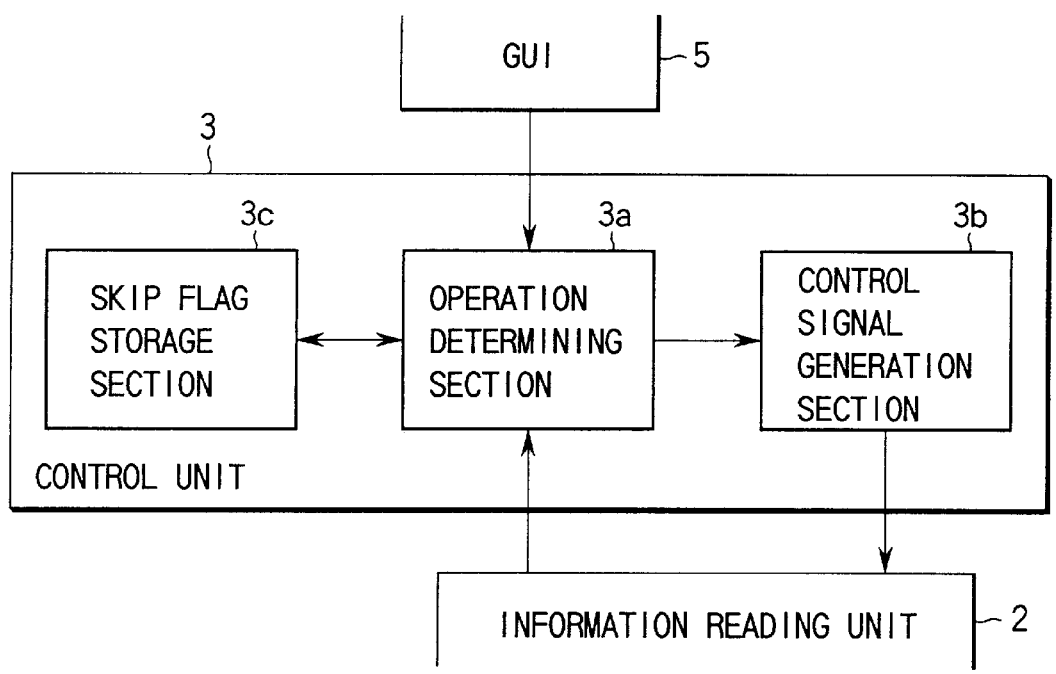
FIG. 4 is a block diagram showing a control unit.

FIG. 4 shows the control unit 3 which comprises an operation determining section 3a, a control signal generating section 3b and a skip flag storage section 3c.

The operation determining section 3a receives the control code output from the information reading unit 2, and then analyzes the contents of the control code so that the operation determining section 3a determines whether the operation is the operation for reproducing main information or the operation for reproducing sub-information.

In the skip flag storage section 3c, a skip flag is stored with which whether or not a skip instructed from the user through the GUI 5 when information is reproduced is performed is determined.

When a determination has been performed that the control code is sub-information code, the operation determining section 3a sets (FALSE) the skip flag. When a determination has been performed that the control code is main information code, the operation determining section 3a resets (TRUE) the skip flag.

The control signal generating section 3b generates a signal which is transmitted to the information reading unit 2 in accordance with an instruction issued from the operation determining section 3a.

Figure 5:
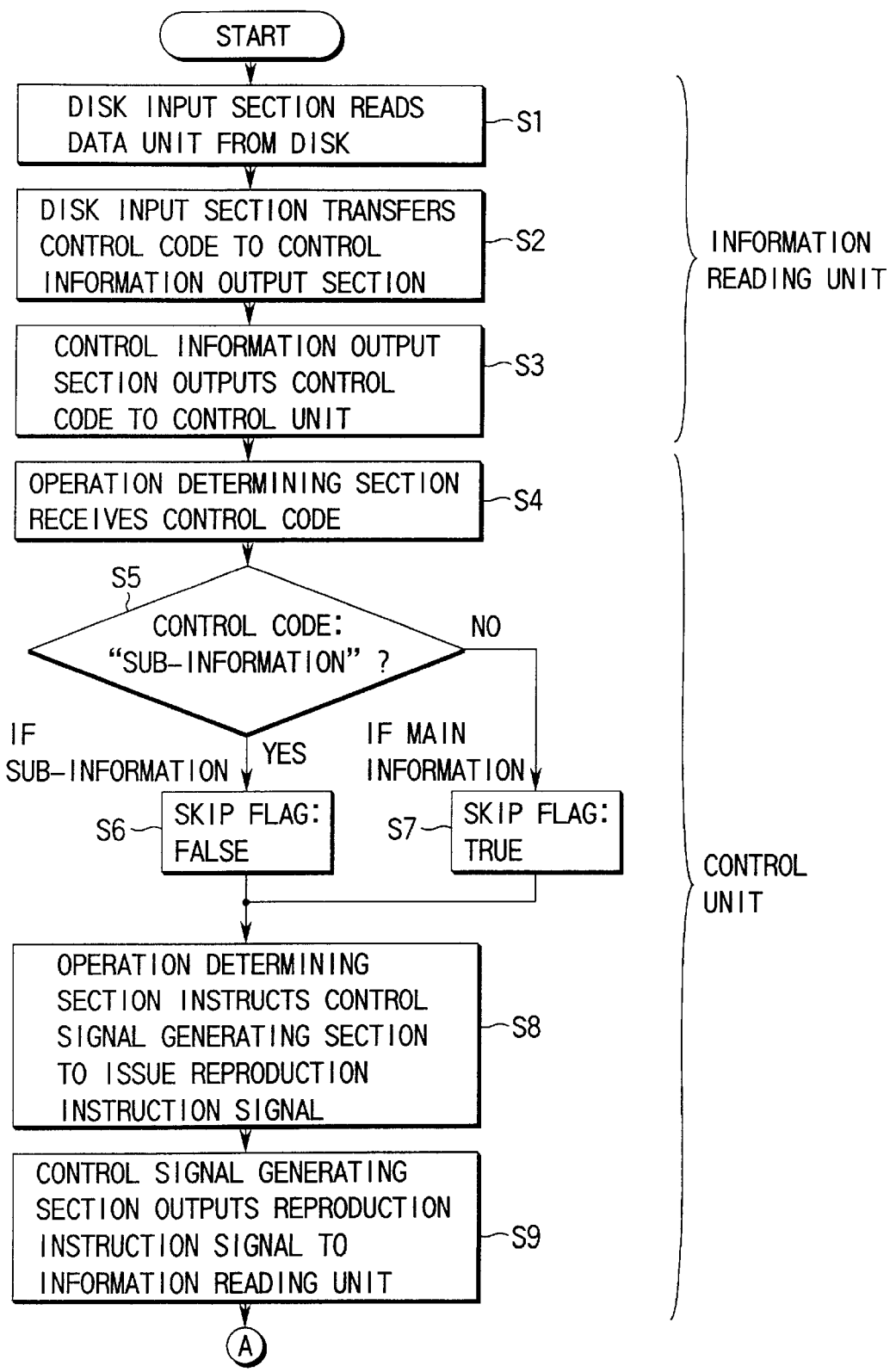
FIG. 5 is a flow chart of the operation of the information reproducing apparatus according to the first embodiment of the present invention.
Figure 6:
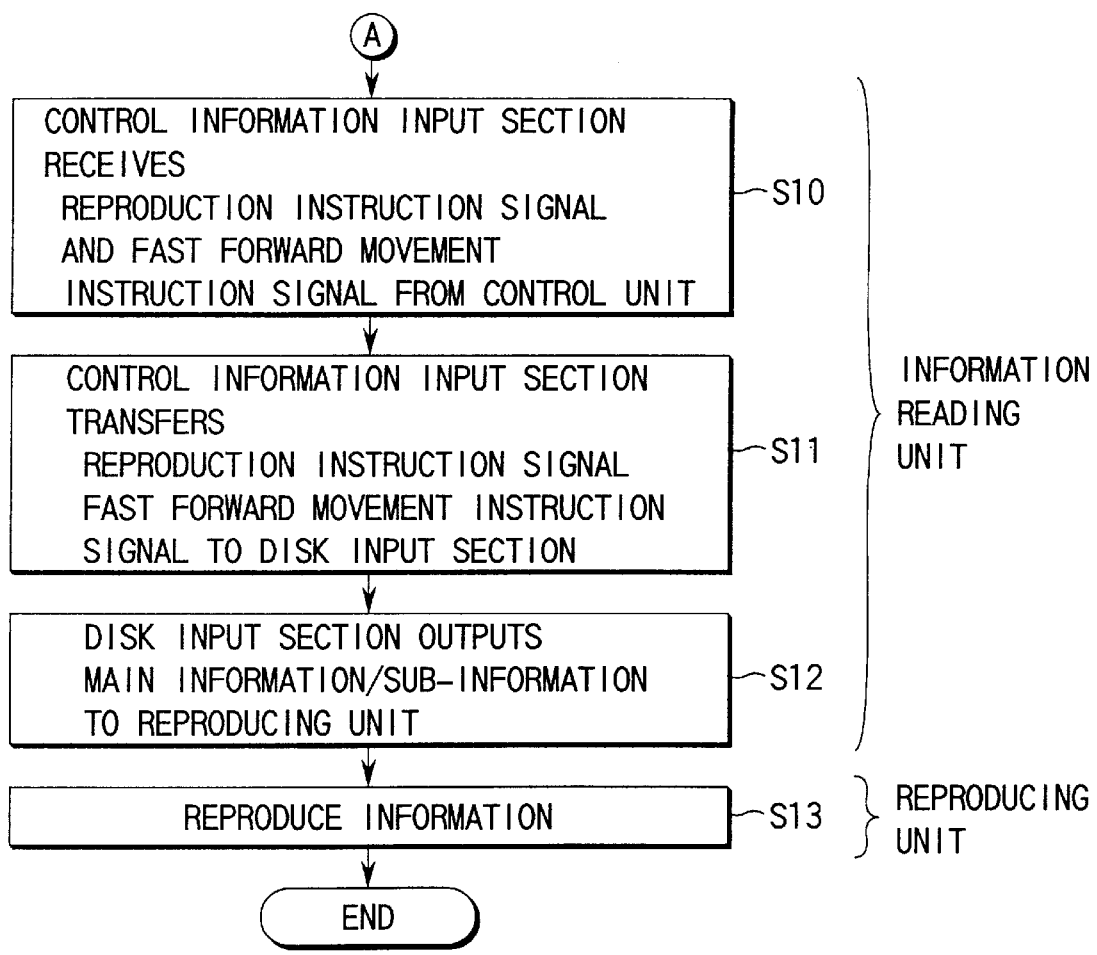
FIG. 6 is a flow chart showing the operation of the information reproducing apparatus according to the first embodiment of the present invention.

Referring to a flow chart shown in FIGS. 5 to 7, the operation of the information reproducing apparatus shown in FIG. 1 will now be described.

When the user has loaded the disk 1 into a predetermined position in the information reading unit 2, the disk input section 2a reads the data unit from the disk 1 (step S1).

The disk input section 2a transfers the control code included in the read data unit to the control information output section 2b (step S2). The control information output section 2b outputs the control code transferred from the disk input section 2a to the control unit 3 (step S3).

The operation determining section 3a of the control unit 3 receives the control code transferred from the control information output section 2b (step S4). If the control code is sub-information code (step S5), the operation proceeds to step S6 so that the operation determining section 3a turns on (FALSE) the skip flag stored in the skip flag storage section 3c. If the control code is main information code, the operation proceeds to step S7 so that the operation determining section 3a resets the skip flag (TRUE).

Then, the operation determining section 3a instructs the control signal generating section 3b to issue a reproduction instruction signal of information (main information/sub-information) in accordance with the control code (step S8). Thus, the control signal generating section 3b outputs the reproduction instruction signal to the information reading unit 2 (step S9).

When the control information input section 2c of the information reading unit 2 has received the reproduction instruction signal from the control signal generating section 3b (step S10 shown in FIG. 6), the control information input section 2c further transfers the reproduction instruction signal to the disk input section 2a (step S11).

The disk input section 2a outputs main information or sub-information stored in the read data unit to the reproducing unit 4 (step S12). Then, the reproducing unit 4 reproduces information (step 13), and then reproduced information is displayed through the GUI 5.

The above-mentioned process is repeated whenever the data unit is read by the information reading unit 2.

The operation, which is performed by the information reproducing apparatus shown in FIG. 1 when the user has issues an instruction of "fast forward movement" through the GUI 5, will now be described with reference to a flow chart shown in FIG. 7. At this time, the instruction of fast forward movement is issued from the GUI 5 to the control unit 3.

When the operation determining section 3a of the control unit 3 has received the instruction of the fast forward movement (step S14), the operation determining section 3a checks the state (that is, the value) of the skip flag stored in the skip flag storage section 3c. If the skip flag is "TRUE", that is, if main information is being reproduced, the operation proceeds to step S16. If the skip flag is "FALSE", that is, if sub-information is being reproduced, the instruction of fast forward movement is ignored.

When the operation determining section 3a has received the instruction of the fast forward movement in a state where main information is being reproduced, the operation determining section 3a instructs the control signal generating section 3b to issue a fast forward movement instruction signal (step S16). Thus, the control signal generating section 3b outputs the fast forward movement instruction signal to the information reading unit 2 (step S17). As a result, a predetermined fast forward movement operation is executed by the information reading unit 2, and then fast forward movement information is displayed on the GUI 5.

As described above, according to the first embodiment, a control code for distinguishing main information and sub-information from each other is additionally recorded for each reading unit (the data unit) on the information recording medium 1.

Whenever the information reading unit 2 reads the disk, the operation determining section 3a of the control unit 3 updates the skip flag. When information is reproduced, a reference to the skip flag is made. When main information is reproduced, the fast forward movement can be instructed to follow an instruction from a user. When sub-information is reproduced, the instruction of the fast forward movement is ignored.

As a result, sub-information for supplementing main information or sub-information which is important information, for example, information of sponsor of main information, can reliably be presented to the user.

Second Embodiment

An information reproducing apparatus according to a second embodiment of the present invention will now be described.

The overall structure of the information reproducing apparatus according to the second embodiment is similar to that shown in FIG. 1 except for the structure of the control unit 3, that of the format of record and the overall operation being different from those shown in FIG. 1.

FIGS. 8A to 8D show a specific example of the format of record for use in the information reproducing apparatus according to the second embodiment of the present invention.

Figure 8A:
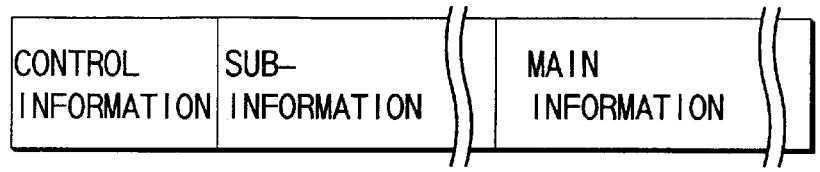
FIG. 8A is a diagram showing the format of record in an information reproducing apparatus according to a second embodiment of the present invention.

The format with which information is recorded by the disk 1 is, as shown in FIG. 8A, composed of a portion for storing control information, a portion for storing sub-information and a portion for storing main information.

Control information is composed of a set consisting of a plurality of conditions (for example, a control condition, an action and an end condition) and an action.

The action is an irregular command to read or reproduce sub-information or main information which is generated during usual operation for reading or reproducing main information or sub-information.

The control condition is an action start condition which is determined in accordance with information or the like communicated to the control unit 3 through the information reading unit 2 or the GUI 5. The control condition is instructed with a specific control code in, for example, the title of a short film, main information or sub-information communicated through the information reading unit 2 or offset address (frame number or the like permitted) from the leading end of main information which is being reproduced, the ID of the information reproducing apparatus communicated through the GUI 5, the user ID, an operation instruction issued from the user or their combination.

The end condition is an end condition which is determined in accordance with information or the like communicated to the control unit 3 through the information reading unit 2 or the control unit 3 and under which the action is ended. The end condition is instructed with, for example, null, a specific control code in main information or sub-information, which is being reproduced, elapsed time from start of the action or their combination.

If the end condition is null, a determination is performed that the action can be ended at any time. If an end condition is instructed, a determination is performed that completion of the action is inhibited before the end condition is satisfied.

Control information is sometimes embedded in main information or sub-information as an alternative to the state where control condition is stored in the main information storage section or the sub-information storage section.

Figure 8B:
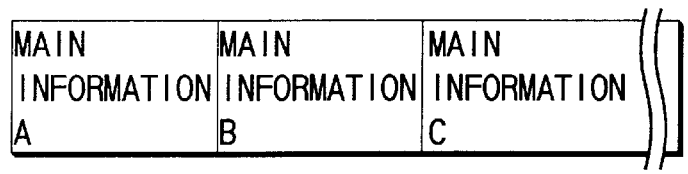
FIG. 8B is a diagram showing the format of record in an information reproducing apparatus according to a second embodiment of the present invention.
Figure 8C:
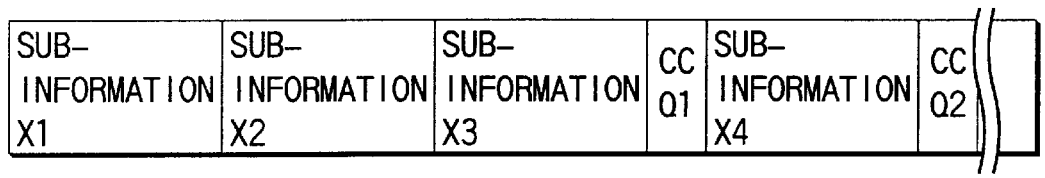
FIG. 8C is a diagram showing the format of record in an information reproducing apparatus according to a second embodiment of the present invention.
Figure 8D:
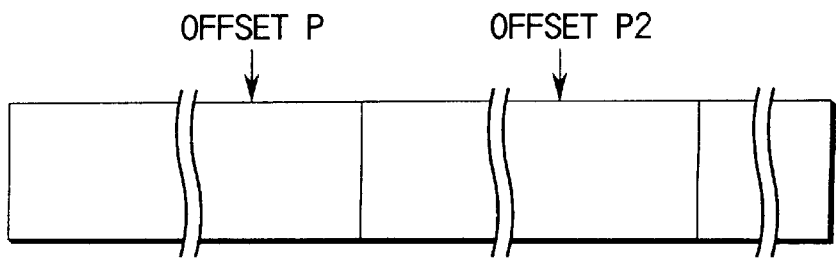
FIG. 8D is a diagram showing the format of record in an information reproducing apparatus according to a second embodiment of the present invention.

Main information data, which is stored in the main information storage section, is a set of, for example, short films (main information A, main information B, main information C, . . . , ), as shown in FIG. 8B. Sub-information data which is stored in the sub-information storage section is set of a plurality of, for example, commercial information (sub-information×1, sub-information×2, sub-information×3, sub-information×4, . . . , ), as shown in FIG. 8C. Main information data and sub-information data sometimes include a control code (cc) which may serve as the action start condition or end condition.

Figure 9:
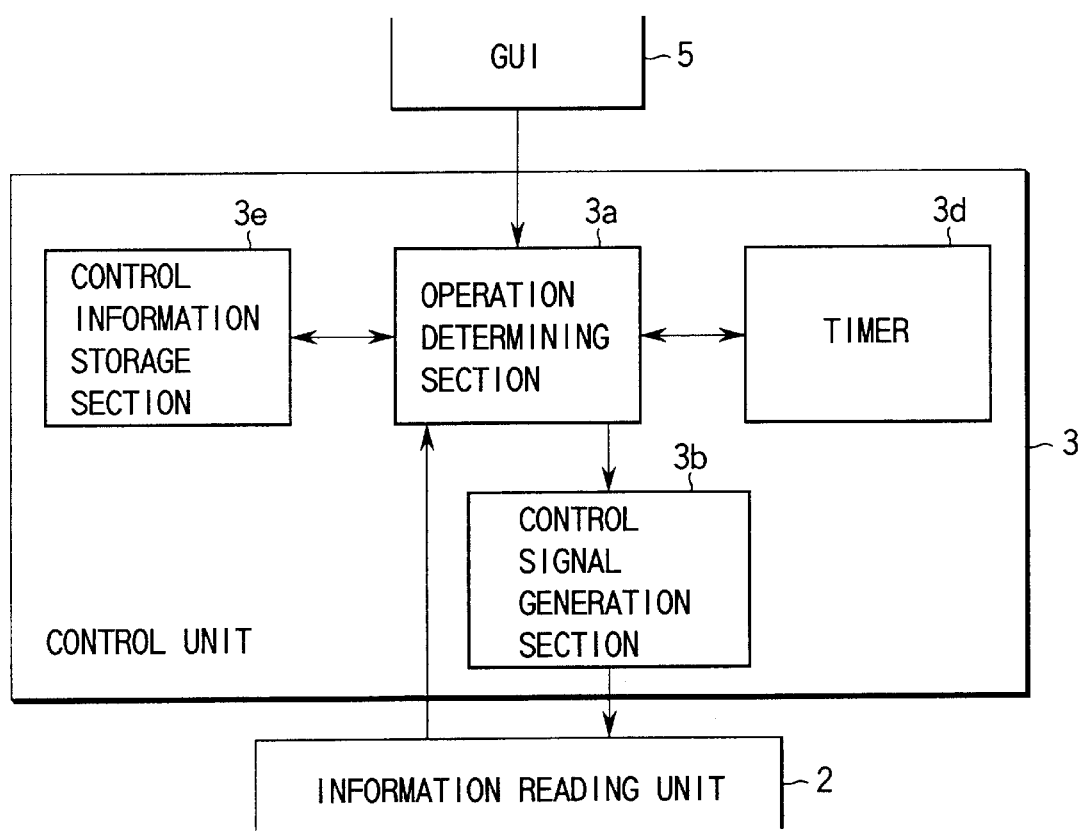
FIG. 9 is a block diagram showing a control unit of the information reproducing apparatus according to the second embodiment of the present invention.

FIG. 9 is a block diagram showing the control unit 3, which comprises a operation determining section 3a, a control signal generating section 3b, a timer 3d and a control information storage section 3e.

The operation determining section 3a transfers, to the control information storage section 3e, control information transferred from the information reading unit 2. Moreover, the operation determining section 3a analyzes the contents of various information items communicated though the information reading unit 2 and the GUI 5. In addition, the operation determining section 3a makes a reference to the control condition and the end condition contained in the control information stored in the control information storage section 3e so as to determine the operation, for example, reproduction of main information, reproduction of sub-information or start or end of the action.

The control information storage section 3e receives control information read from the disk 1 through the operation determining section 3a and stores control information when the disk 1 has been loaded into the information reading unit 2 and the reading operation has been started.

When the operation determining section 3a has determined that the action is started, that is, when a determination has been performed that, for example, sub-information×2 is reproduced in a state where reproducing time of sub-information×2 has been instructed as the action end condition, the instructed time is set to the timer 3d by the operation determining section 3a when sub-information×2 is reproduced.

The control signal generating section 3b issues a signal which is output to the information reading unit 2 in accordance with an instruction issued from the operation determining section 3a.

Referring to a flow chart shown in FIG. 10 and ensuing figures, the operation of the information reproducing apparatus according to the second embodiment will now be described.

An example of control information stored in the control information storage section of the disk 1 for use in the following description will now be described.

Control Information: (Control Condition and Action and End Condition)

Control Information 1: (Disk set, (Reproduction of Sub-Information×1 and Position at which Sub-Information×1 is Recorded), null)

Control Information 2: (title 1, (Reproduction of Sub-Information×2 and Position at which Sub-Information×2 is Recorded) and Reproducing Time t1)

Control Information 3: (Offset p1 of Main Information A, (Reproduction of Sub-information×3 and Position at Which Sub-Information is Recorded) and Control Code ccQ1)

The control code included in sub-information is hereinafter used only as the action end condition.

Figure 10:
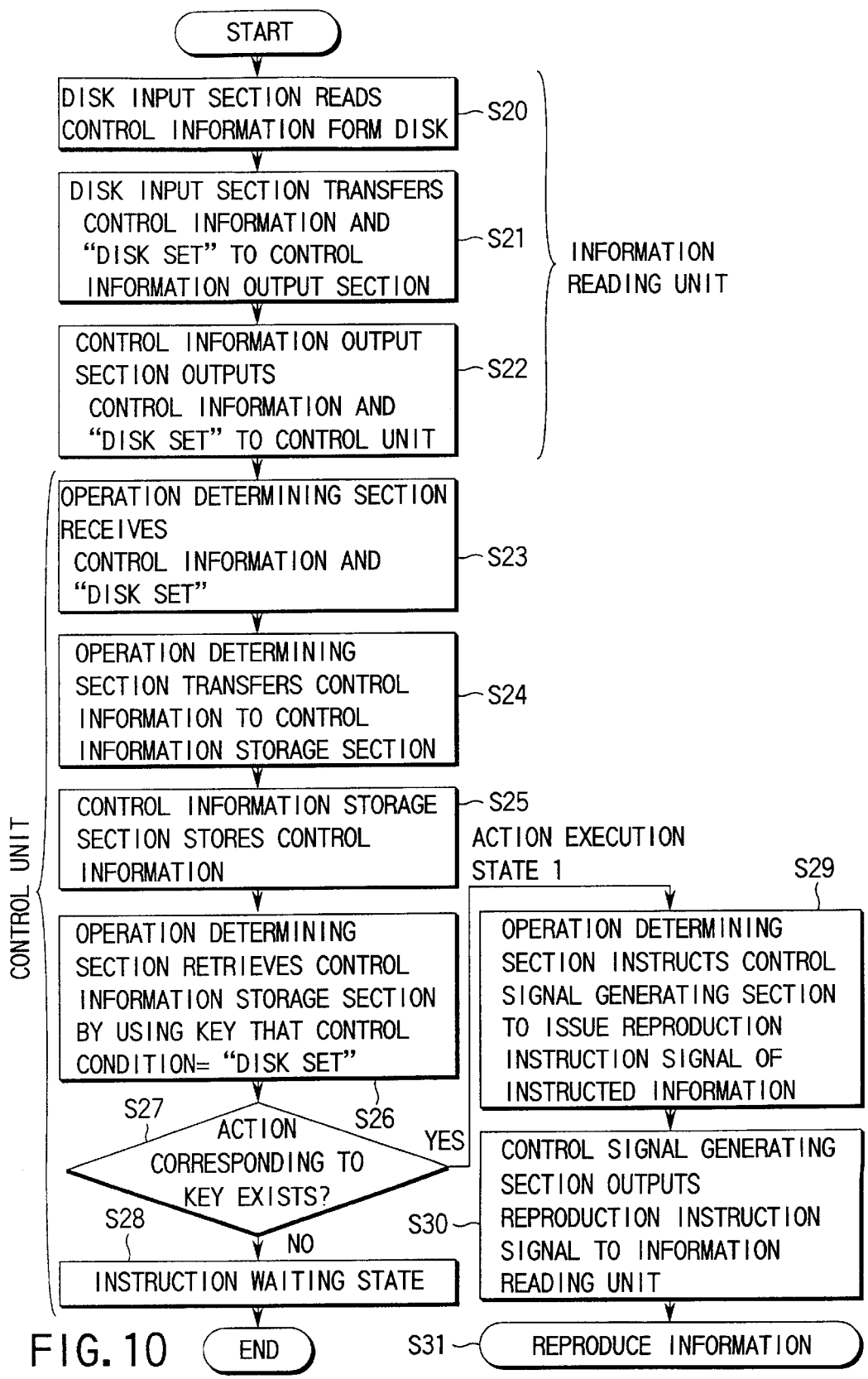
FIG. 10 is a flow chart of the operation (action execution state 1) of the information reproducing apparatus according to the second embodiment of the present invention.

Referring to the flow chart shown in FIG. 10, when a user has loaded the disk 1 into a predetermined position in the information reading unit 2, the disk input section 2a reads control information from the control information storage section of the disk 1 (step S20).

When control information read by the disk input section 2a and information notifying the operation performed by the user, that is, "disk set" has been transferred to the control information output section 2b (step S21), the control information output section 2b outputs control information and the "disk set" to the control unit 3 (step S22).

When the operation determining section 3a of the control unit 3 has received control information and the "disk set" (step S23), the operation determining section 3a initially transfers control information to the control information storage section 3e (step S24). Control information is stored in the control information storage section 3e (step S25).

On the other hand, the operation determining section 3a uses the "disk set" as a key to retrieve control information having the control condition which is the "disk set" among control information stored in the control information storage section 3e (step S26).

If control information having the control condition corresponding to the key "disk set" is not detected (step S27), a state where an instruction from the user is waited for is realized (step S28).

If control information corresponding to the "disk set" is detected, the contents of the action included in control information 1, that is, reproduction of sub-information×1 is executed. At this time, the operation determining section 3a transfers, to the control signal generating section 3b, the position, at which sub-information×1 is recorded, and an instruction to issue a signal instructing reproduction of sub-information×1 (step S29).

The control signal generating section 3b outputs the signal instructing reproduction of sub-information×1 to the information reading unit 2 together with the position at which sub-information×1 is recorded (step S30). When the control information input section 2c of the information reading unit 2 has received the reproduction instruction signal from the control signal generating section 3b, the control signal generating section 3b further transfers the reproduction instruction signal to the disk input section 2a.

The disk input section 2a reads instructed sub-information×1 from the position at which sub-information×1 is recorded, and then outputs it to the reproducing unit 4. Sub-information×1 reproduced by the reproducing unit 4 is displayed by the GUI 5, for example, as shown in FIG. 11 (step S31).

The sub-information×1 is displayed on the GUI 5 in such a manner that titles of main information A, B and C, which have been recorded on the disk 1, that is, "title 1", "title 2" and "title 3" and corresponding sponsors are displayed, as shown in FIG. 11.

An assumption is made that the user has selected "title 1" (main information A) by clicking it with a mouse or the like. Thus, a signal instructing reproduction of "title" 1 is output to the operation determining section 3a of the control unit 3 through the GUI 5 (step S32 shown in FIG. 12). The operation determining section 3a receives the reproduction instruction signal and determines that the action of control information 1 has been ended (because the end condition of control information 1 is "null"), and then instructs the control signal generating section 3b to generate a signal to interrupt reproduction of sub-information×1 (step S33).

The control signal generating section 3b outputs reproduction interruption instruction signal to the information reading unit 2 (step S34) so that reproduction of sub-information×1 is interrupted and the action of control information 1 is ended (step S35).

Figure 12:
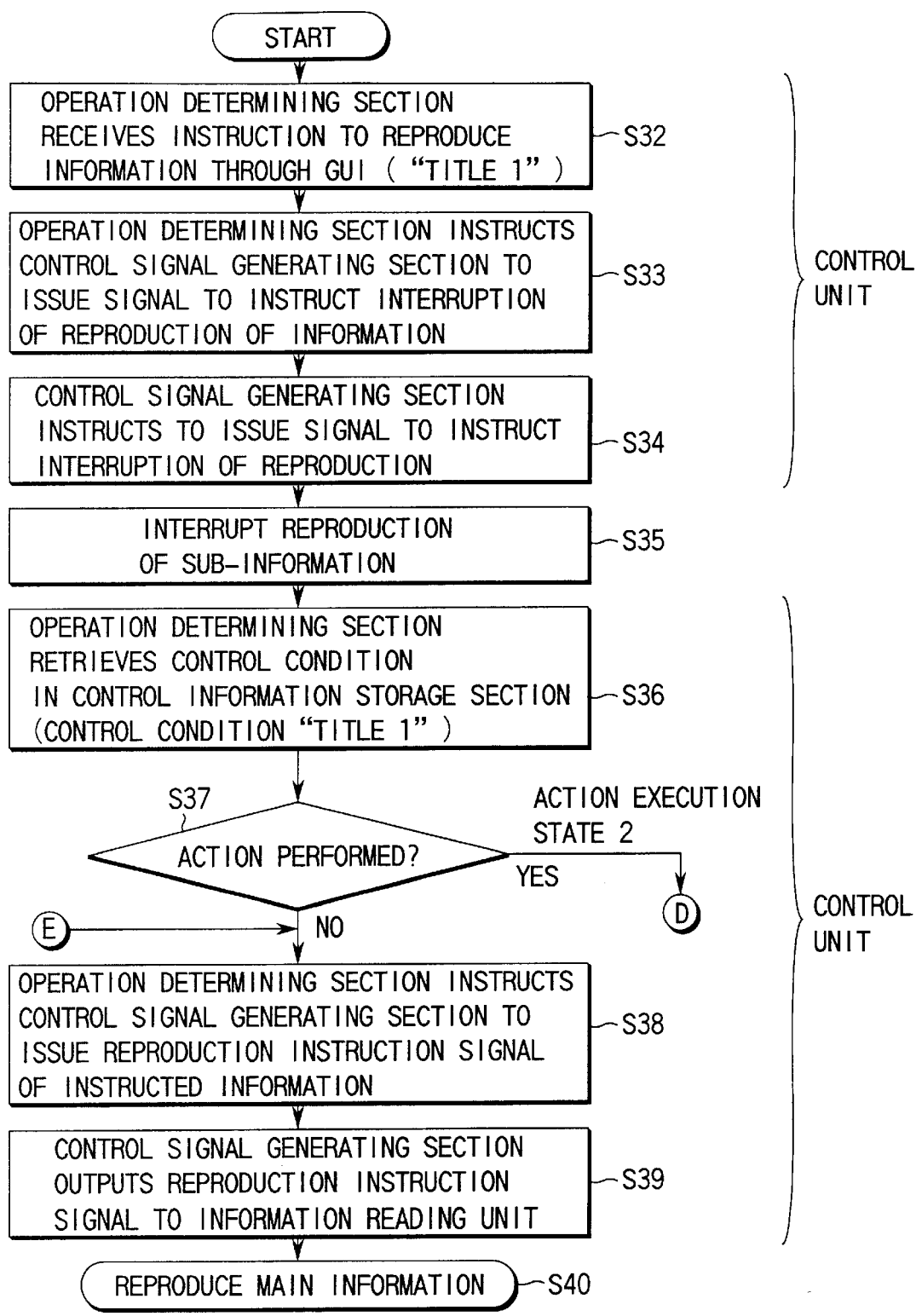
FIG. 12 is a flow chart of the operation (action end state 1 and action execution state 2) of the information reproducing apparatus according to the second embodiment of the present invention.

When the operation determining section 3a has received the signal instructing the reproduction of "title 1" in step S32 shown in FIG. 12, the operation determining section 3a uses the "title 1" as a key to retrieve control information having the control condition "title 1" among control information stored in the control information storage section 3e (step S36).

If no control information having the control condition corresponding to the key "title 1" is detected, the operation determining section 3a instructs the control signal generating section 3b to generate a signal instructing reproduction of "title 1" (main information A) to follow the instruction from the user (step S38).

The signal instructing reproduction of main information A is output from the control signal generating section 3b to the information reading unit 2 (step S39) so that reproduction of main information A is started (step S40).

Figure 13A:
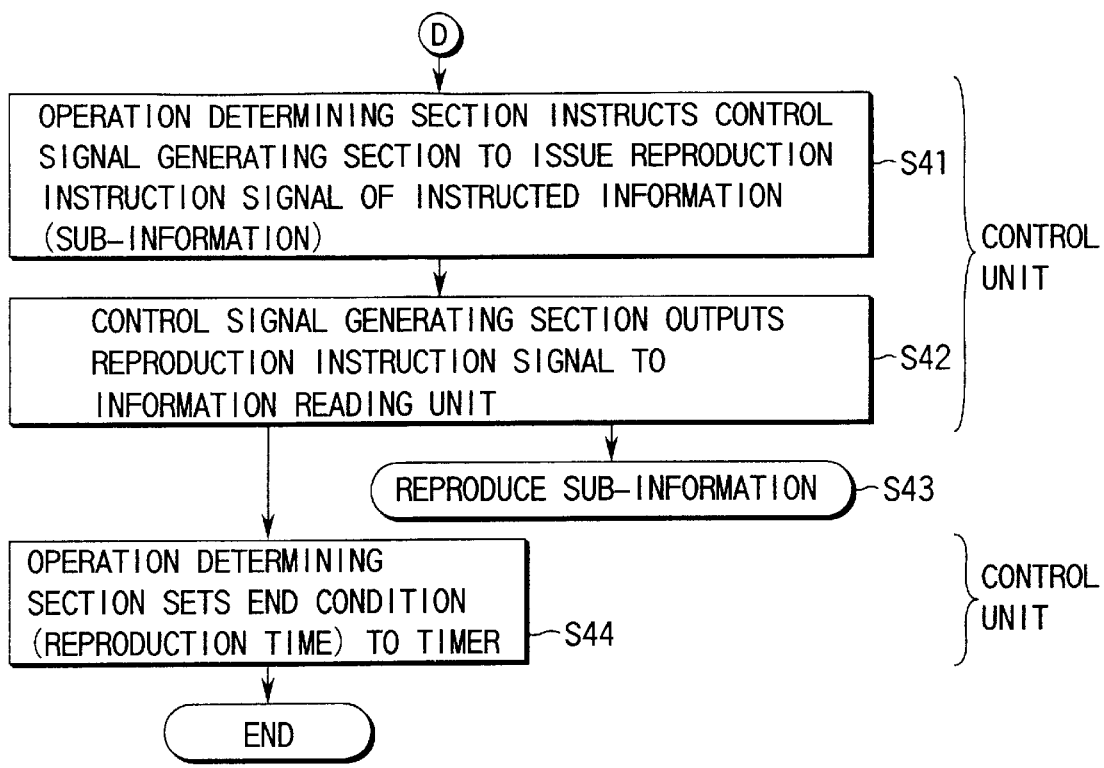
FIG. 13A is a flow chart of the operation (action end state 2) of the information reproducing apparatus according to the second embodiment of the present invention.

If control information (control information 2) having the control condition corresponding to "title 1" is detected in step S37 shown in FIG. 12, the operation proceeds to step S41 shown in FIG. 13A so that the contents of the action included in control information 2, that is, reproduction of sub-information×2 is executed.

At this time, the operation determining section 3a transfers, to the control signal generating section 3b, an instruction to issue a signal instructing reproduction of sub-information×2 together with the position at which sub-information×2 has been recorded (step S41). The control signal generating section 3b outputs, to the information reading unit 2, the signal instructing reproduction of sub-information×2 together with the position at which sub-information×2 has been recorded (step S42) similarly to the above-mentioned process (step S31 shown in FIG. 10) so that reproduction of sub-information×2 is started (step S43).

Since control information 2 has instructed time t1 for which sub-information×2 is reproduced, the operation determining section 3a sets t1 to the timer 3d (step S44) so that measurement of the time for which sub-information×2 is reproduced is started.

Figure 13B:
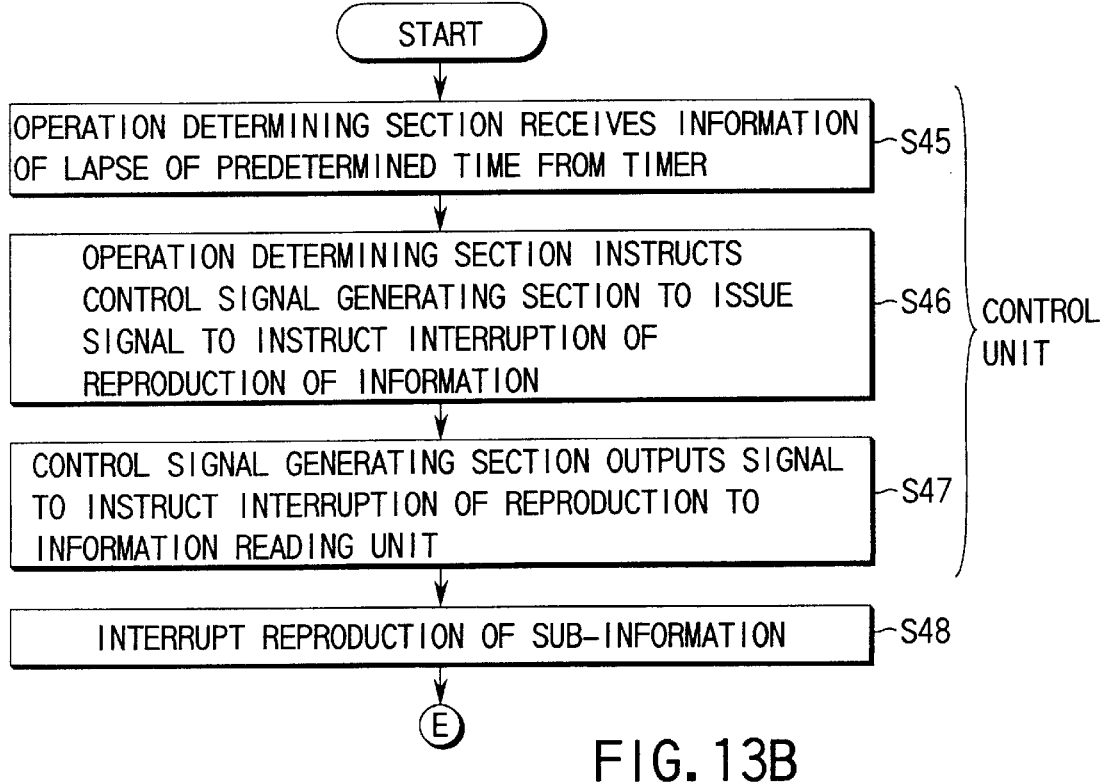
FIG. 13B is a flow chart of the operation (action end state 2) of the information reproducing apparatus according to the second embodiment of the present invention.

When the operation determining section 3a has received information indicating lapses of reproduction time t1 from the timer 3d (step S45 shown in FIG. 13B), the operation determining section 3a instructs the control signal generating section 3b to generate a signal instructing interruption of reproduction of sub-information×2 (step S46). Thus, the control signal generating section 3b outputs reproduction interruption instruction signal to the information reading unit 2 (step S47) so that reproduction of sub-information×2 is interrupted. Thus, the action of control information 1 is ended (step S48). Then, the operation returns to step S38 shown in FIG. 12 so that the operation returns to the process for reproducing "title 1" (main information A) previously instructed by the user.

As described above, when the user has instructed reproduction of "title 1", sub-information×2 (for example, a commercial from a sponsor) instructed with control information is reproduced for predetermined time, and then the instructed title is reproduced.

Referring to a flow chart shown in FIGS. 14 to 16, the operation for reproducing main information (step S40 shown in FIG. 12) and the operation for starting and ending the action during reproduction of the foregoing main information will now be described.

When the reproduction instruction signal output from the control signal generating section 3b is by the control information input section 2c of the information reading unit 2 to follow the instruction issued from the operation determining section 3a of the control unit 3 (step S50), the disk input section 2a reads instructed information data in predetermined length units from the instructed position in the disk 1 as briefly described in step S31 shown in FIG. 10 (step S51).

If reading of information data is ended at this time, the reproduction process is ended (step S52).

Then, whether or not a control code is included in information data having a predetermined length (for example, a predetermined number of bytes) read by the disk input section 2a is determined (step S53).

If no control code is included, the disk input section 2a transfers the offset address of read information data and the number of read bytes to the control information output section 2b (step S54).

The transferred offset address of information data and the number of read bytes are output from the control information output section 2b to the control unit 3 (step S55).

When the operation determining section 3a of the CONTROL UNIT 3 receives the offset address of information data and the number of read bytes (step S56), retrieval of control information stored in the control information storage section 3e is performed (step S57).

The above-mentioned retrieval is performed in such a manner that control conditions included in the range from the offset range supplied from the information reading unit 2, that is, from the offset address supplied from the disk input section 2a to the sum of the offset address received from the disk input section 2a and the number of bytes supplied from the disk input section 2a are retrieved in the control information storage section.

If control information including the control condition adaptable to the supplied offset range is detected (step S58), the operation proceeds to step S70 so that the contents of the action included in the control condition are executed. If no adaptable control information is detected (step S58), the operation proceeds to step S59 shown in FIG. 15 so that the information reading unit 2 performs the process for reproducing read information data.

Figure 15:
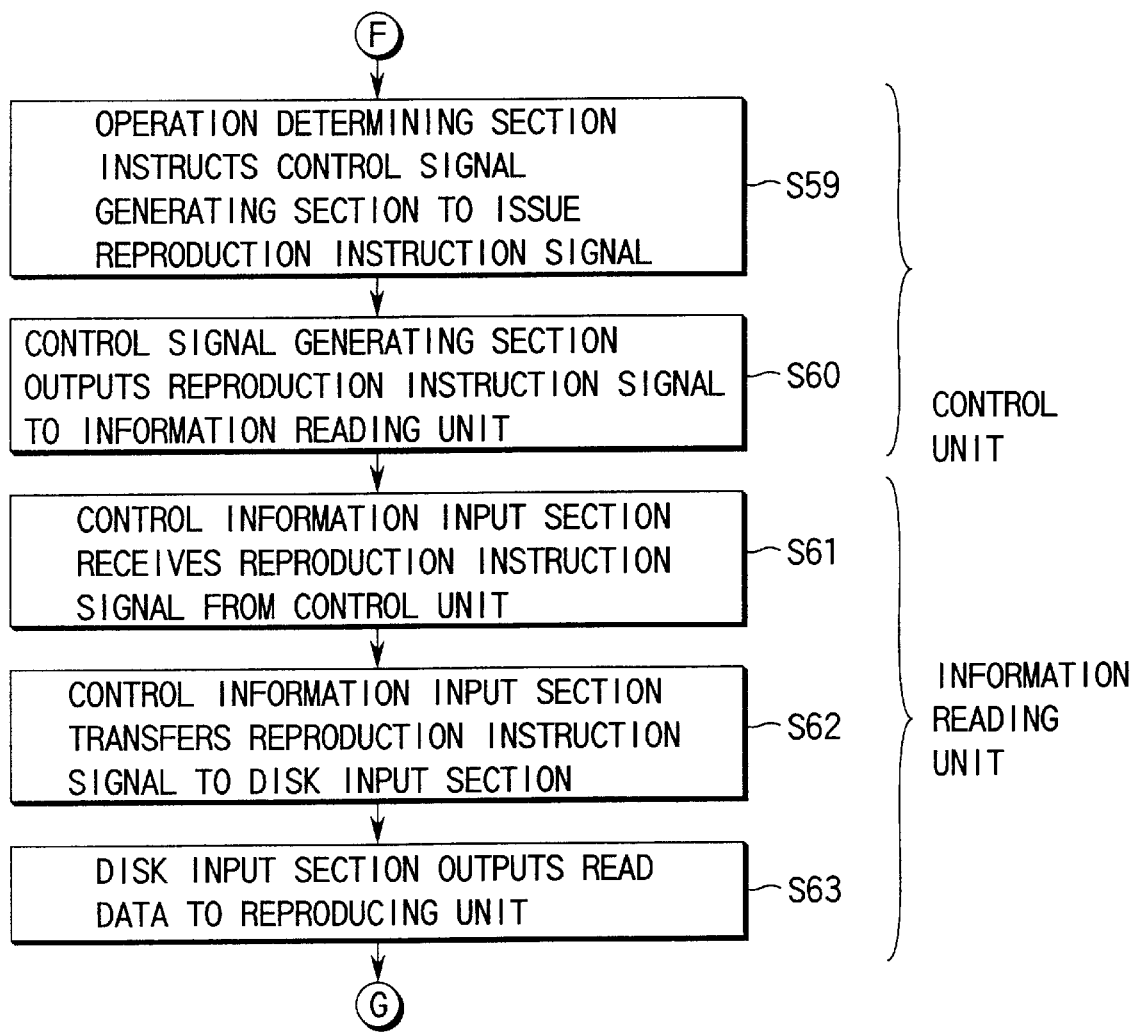
FIG. 15 is a flow chart of the operation (reproduction of main information) of the information reproducing apparatus according to the second embodiment of the present invention.
Figure 16:
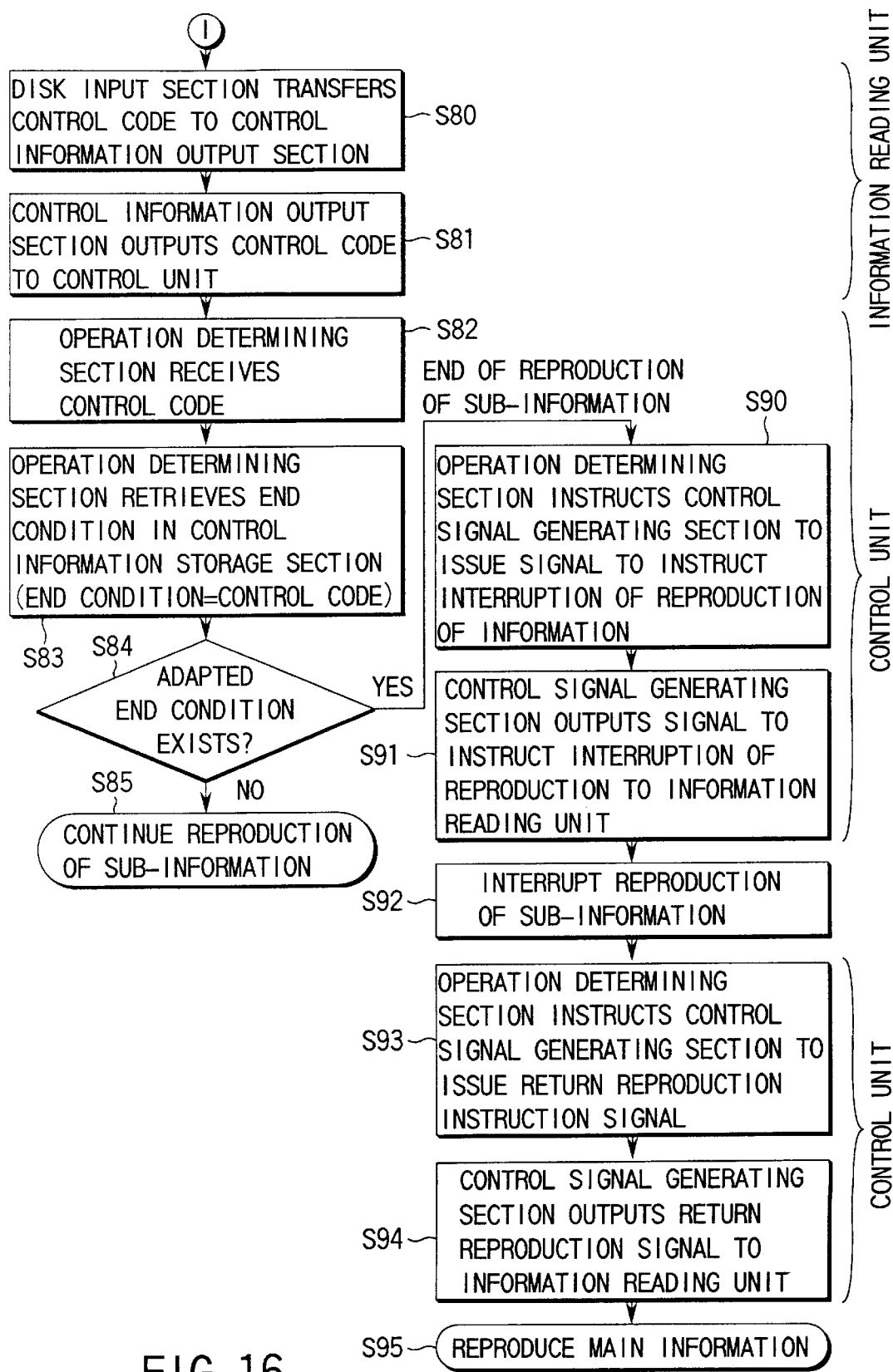
FIG. 16 is a flow chart of the operation (action end state 3) of the information reproducing apparatus according to the second embodiment of the present invention.

That is, as shown in the flow chart shown in FIG. 15, the operation determining section 3a instructs the control signal generating section 3b to issue a reproduction instruction signal (step S59). The control signal generating section 3b outputs the reproduction instruction signal to the information reading unit 2 (step S60).

When the control information input section 2c of the information reading unit 2 has received reproduction instruction signal (step S61), the reproduction instruction signal is transferred to the disk input section 2a (step S62). The disk input section 2a outputs read information data to the control unit 3 (step S63) so that a reproduced image is displayed on the GUI 5.

If no information serving as a control condition is included in information data read by the disk input section 2a, the reproduction of information is performed in such a manner that the processes in steps S51 to step S63 are repeated.

If control information including a control condition adaptable to the supplied offset range is detected in step S58, the contents of the action included in the control condition are executed.

An example case will now be described in which a control condition adaptable to the offset range, that is, control information 3 including offset p1 as the control condition is detected in data read by the information reading unit 2.

Since the contents of the action of control information 3 are reproduction of sub-information×3, the operation determining section 3a transfers, to the control signal generating section 3b, an instruction to issue a signal instructing reproduction of sub-information×3 and the position at which sub-information×3 has been recorded (step S70).

The control signal generating section 3b outputs, to the information reading unit 2, the signal instructing reproduction of sub-information×3 and the position at which sub-information×3 has been recorded (step S71). As a result, reproduction of sub-information×3 is started (step S72).

The operation for reproducing sub-information in step S72 is similar to the process in steps S50 to step S63. An assumption is made that a fact has been detected that a control code is included in information data read in step S53 and read by the disk input section 2a during reproduction of sub-information×3.

The operation which is performed at this time will now be described with reference to a flow chart shown in FIG. 16. That is, a control code is transferred from the disk input section 2a of the information reading unit 2 to the control information output section 2b (step S80). Then, the control code is output from the control information output section 2b to the control unit 3 (step S81).

When the operation determining section 3a of the control unit 3 has received the control code (step S82), control information having the control code as the end condition or the control condition is retrieved in the control information storage section 3e (step S83). If no adaptable control information exists (step S84), the operation returns to step S54 shown in FIG. 14 so that reproduction of, for example, sub-information×3 is continued (step S85).

If the control code is ccQ1 which is an action end condition instructed with control information 3 (step S84), the operation determining section 3a instructs the control signal generating section 3b to issue a signal instructing interruption of reproduction of sub-information×3 (step S90).

Then, the control signal generating section 3b outputs the signal to instruct interruption of reproduction to the information reading unit 2 (step S91) so that reproduction of sub-information×3 is interrupted. Thus, the action of control information 3 is ended.

Then, the operation determining section 3a instructs the control signal generating section 3b to issue a return reproduction instruction signal (step S93). Thus, the return reproduction instruction signal is output from the control signal generating section 3b to the information reading unit 2 (step S94) so that reproduction of main information A is restarted (step S95).

Figure 14:
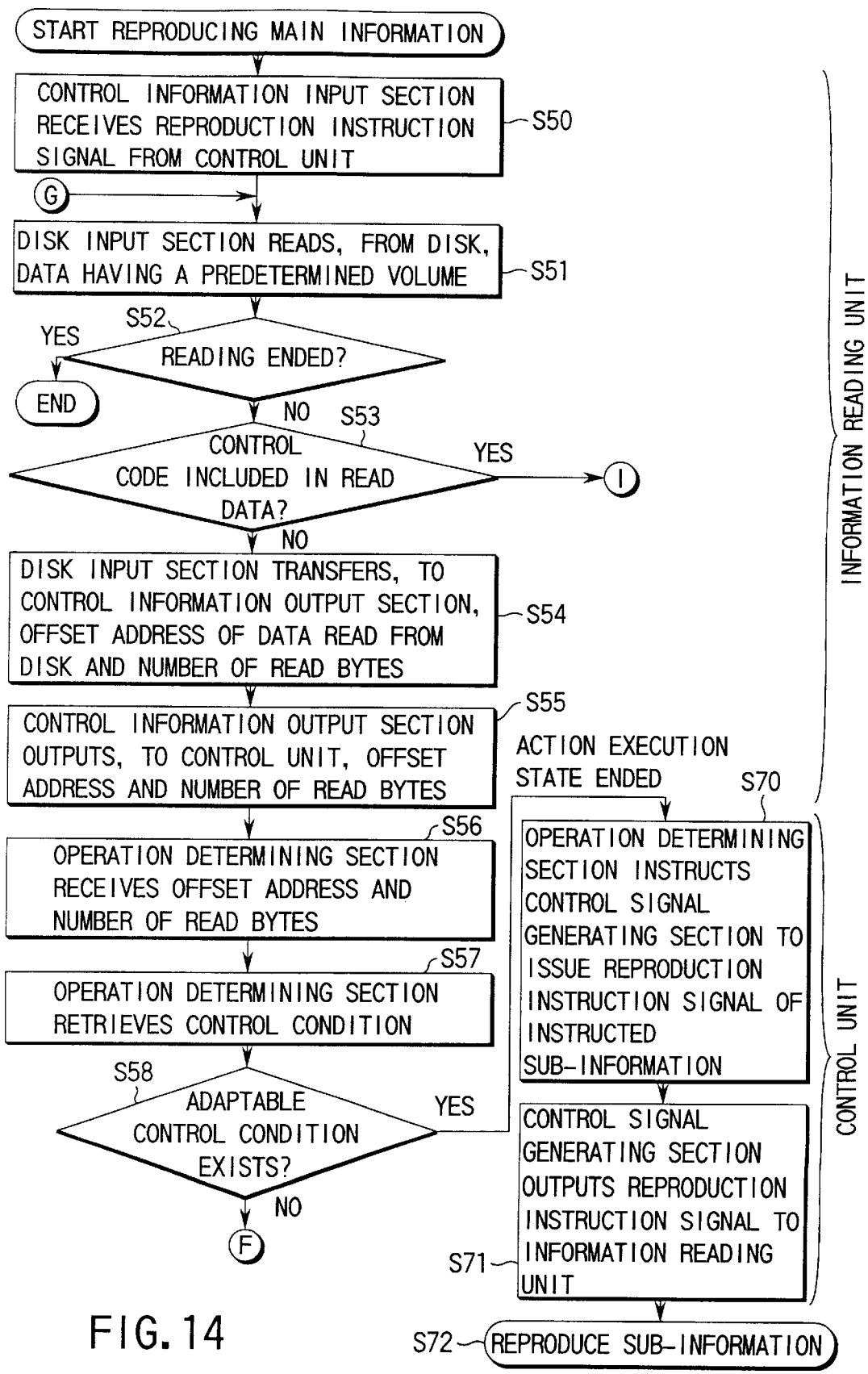
FIG. 14 is a flow chart of the operation (reproduction of main information and action execution state 3) of the information reproducing apparatus according to the second embodiment of the present invention.

In step S95 the operation returns to step S50 shown in FIG. 14 so that a similar process is performed. Thus, reproduction of main information A is restarted.

Figure 17:
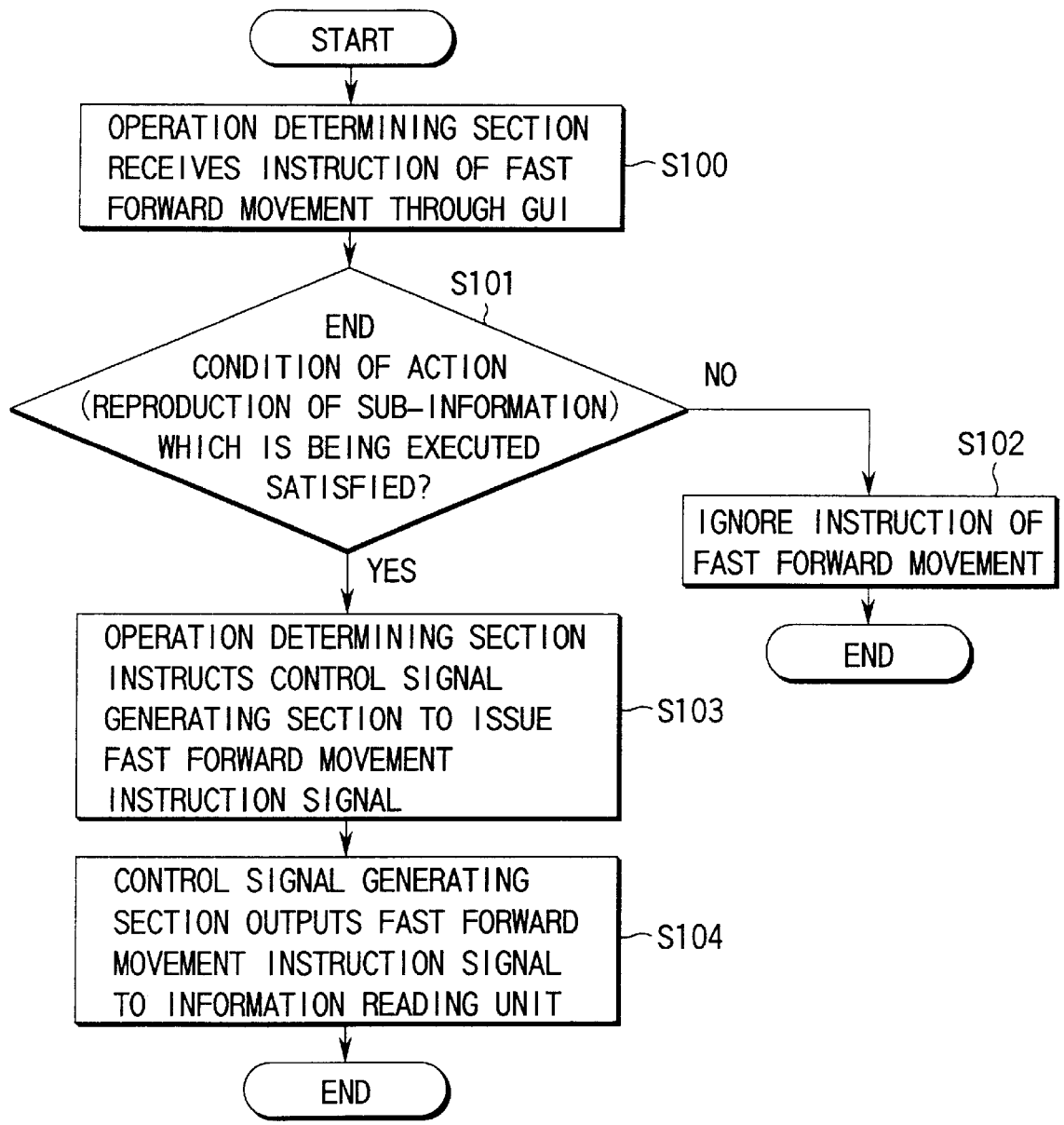
FIG. 17 is a flow chart of the operation (an operation which is performed when fast forward movement is instructed) of the information reproducing apparatus according to the second embodiment of the present invention.

The operation which is performed when an instruction of fast forward movement is issued from a user through the GUI 5 during reproduction of information will now be described with reference to a flow chart shown in FIG. 17.

The instruction of fast forward movement is received by the operation determining section 3a of the control unit 3 through the GUI 5 (step S100).

The operation determining section 3a determines whether the end condition of the action which is being executed has been satisfied, that is, whether sub-information is being reproduced (step S101). When sub-information is being reproduced, the instruction of fast forward movement is ignored (step S102).

If no action is being performed, that is, if main information (a short film or the like) is being reproduced, the operation determining section 3a instructs the control signal generating section 3b to issue a fast forward movement instruction signal (step S103). Thus, the control signal generating section 3b outputs the fast forward movement instruction signal to the information reading unit 2 (step S104) so that fast forward reproduction of main information is performed.

As described above, according to the second embodiment, when reproduction of information recorded on the disk 1 is started, control information of the described reproduction start condition (the control condition) and reproduction end condition of sub-information are read as the action to store control information in the control information storage section 3e of the control unit 3.

The operation determining section 3a of the control unit 3 starts reproducing sub-information if instruction information received through the GUI 5 and information read from the disk 1 by the information reading unit 2 include information adaptable to the condition under which sub-information stored in the control information storage section 3e is started.

If the reproduction end condition stored in the control information storage section 3e is detected during reproduction of sub-information, reproduction of sub-information is ended and the operation returns to reproduction of main information. As a result, arbitrary setting of action control condition and end condition enables a commercial (sub-information) from a sponsor to easily be inserted into an arbitrary position of a short film (main information) which is being reproduced. Moreover, restoration to reproduction to the film, which has been interrupted after the commercial has been ended, can easily be performed.

The operation for inhibiting skip of the reproduction of a commercial (sub-information) and the operation for reproducing a commercial for predetermined time enable important sub-information for supplementing main information or important sub-information relating to the sponsor to reliably be presented to a user.

Third Embodiment

An information reproducing apparatus according to a third embodiment of the present invention will now be described.

Each of the information reproducing apparatuses according to the first and second embodiments is able to insert a commercial from a sponsor into a short film at an adequate timing and inhibit skip of the commercial by a user.

However, the contents of the commercial have been determined when the disk has been manufactured. Therefore, a latest commercial cannot always be inserted. The third embodiment is able to solve the above-mentioned problem.

Figure 18:
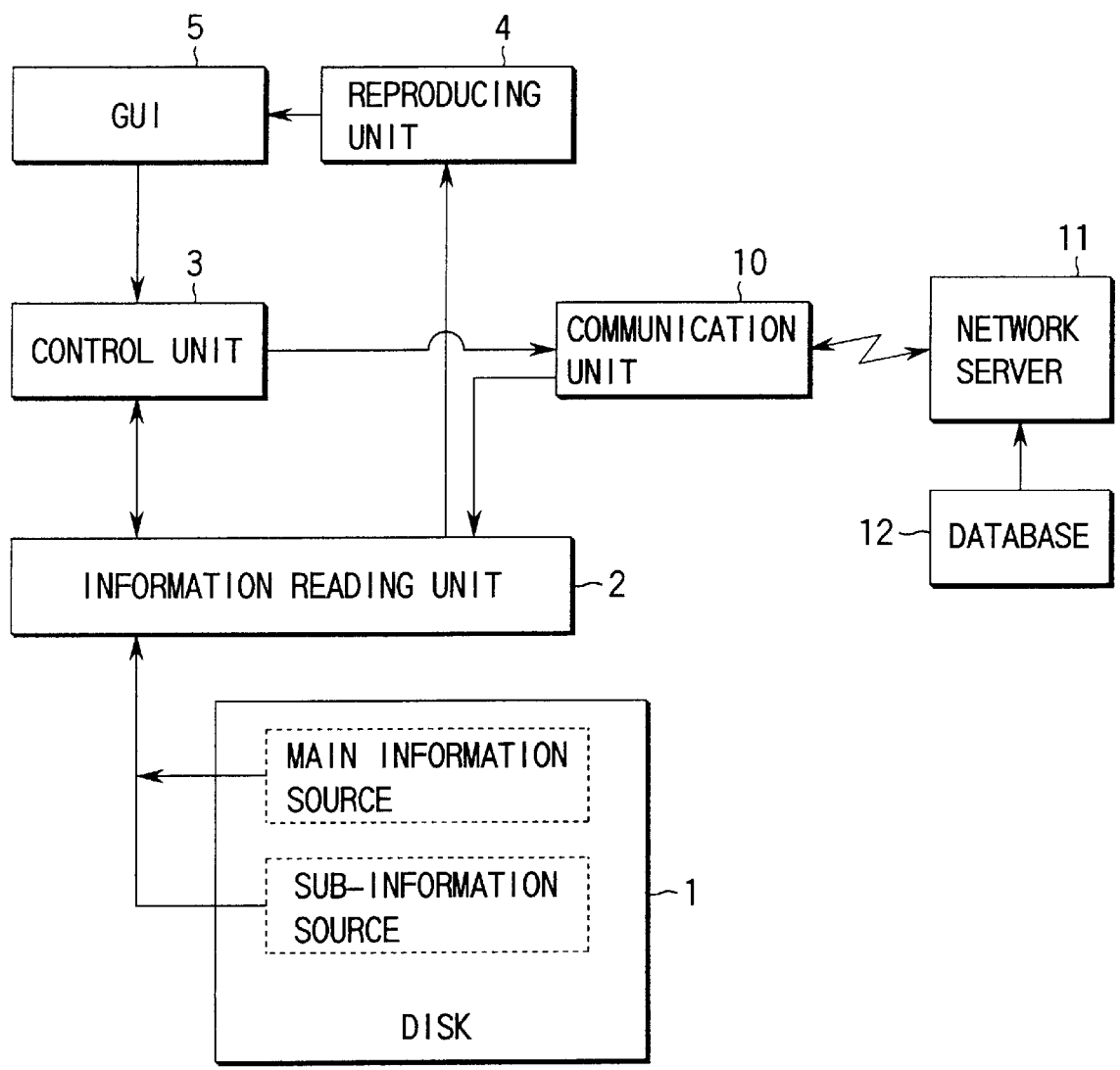
FIG. 18 is a block diagram showing an information reproducing apparatus according to a third embodiment of the present invention.

FIG. 18 shows the information reproducing apparatus according to the third embodiment of the present invention. The same elements as those shown in FIG. 1 are given the same reference numerals, and only the different elements will now be described.

That is, the control unit 3 outputs a control signal to a communication unit 10 if necessary to perform control. When the communication unit 10 has received the predetermined control signal from the control unit 3, the communication unit 10 makes an access to a predetermined network server 11 through a communication network to obtain required information, and then outputs information to the information reading unit 2.

Information received through the network server 11 is hereinafter sometimes called network information.

FIG. 19 shows the format of record for use in the information reproducing apparatus according to the third embodiment of the present invention.

Figures 19A, 19B:
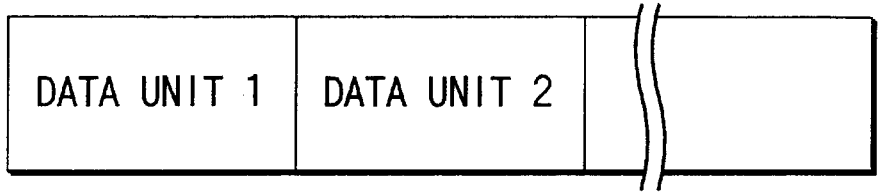
FIG. 19A is a diagram showing the format of record in an information recording medium for use in the information reproducing apparatus shown in FIG. 18.
FIG. 19B is a diagram showing the format of record in an information recording medium for use in the information reproducing apparatus shown in FIG. 18.

The format for recording information for use in the disk 1 is, as shown in FIG. 19A, composed of data units each having a predetermined length. The data unit is one reading unit. Each data unit includes three types as shown in FIG. 19B.

That is, the data unit includes a data unit in which main information is stored, a data unit in which sub-information is stored and a data unit in which network reference information for obtaining sub-information through the network is stored.

Each data unit is composed of a control code storage section for storing main information, sub-information and a control code for distinguishing network reference information; and an information storage section for storing main information or sub-information to have a predetermined length.

Network reference information may include, for example, the address of the network server 11, to which an access must be made, information whether combining of information is performed and an instruction of the method of combining information.

Sub-information may include information for identifying network information which must be reproduced.

Figure 20:
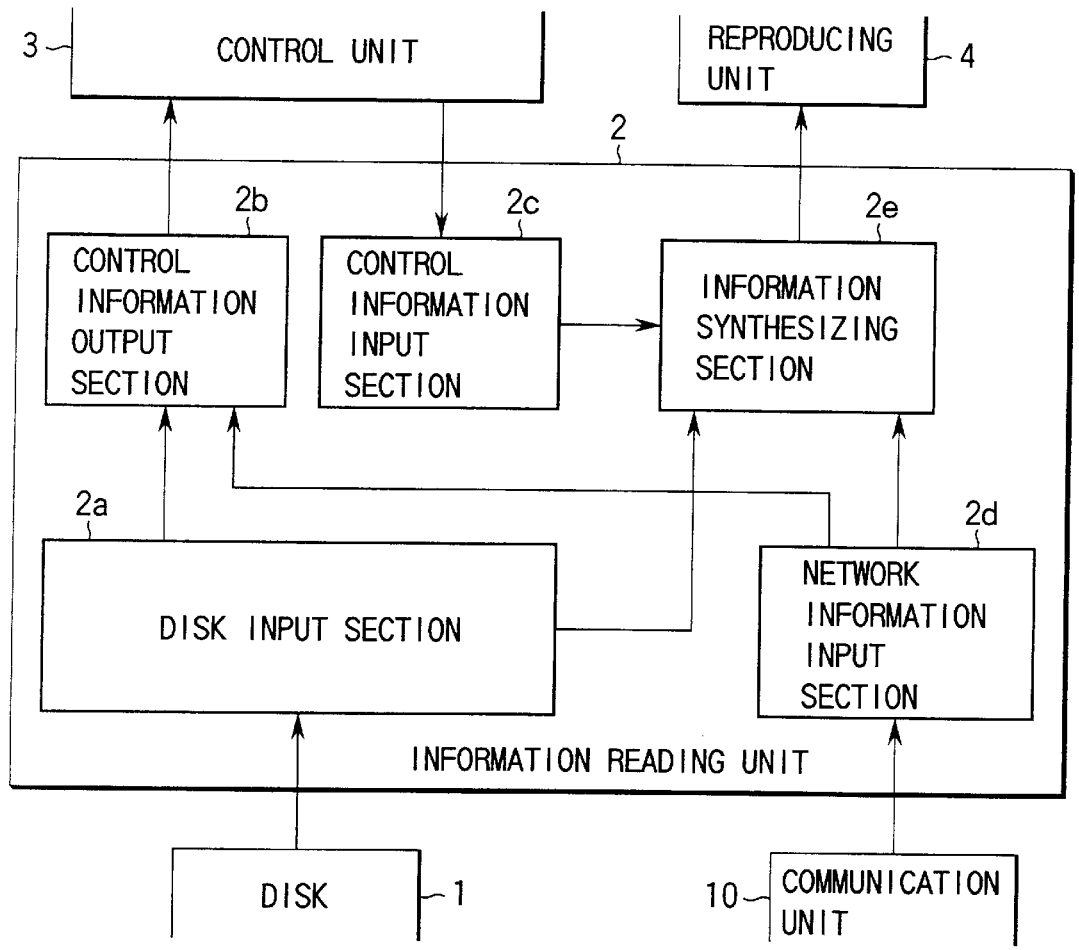
FIG. 20 is a block diagram showing an information reading unit.

FIG. 20 shows the information reading unit 2. The same elements as those shown in FIG. 3 are given the same reference numerals, and only the different elements will now be described. That is, a network information input section 2d and an information combining section 2e are added.

The network information input section (a NW information input section) 2d receives, from the communication unit 10, information (mainly sub-information) received by the communication unit 10 and supplied from the network server 11 so as to subject information to a predetermined information process and then transfer information to the information combining section 2e.

The information combining section 2e is controlled by the control unit 3 to combine information transferred from the network information input section 2d with information transferred from the disk input section 2a if necessary, and then outputs combined information to the reproducing unit 4.

Figure 21:
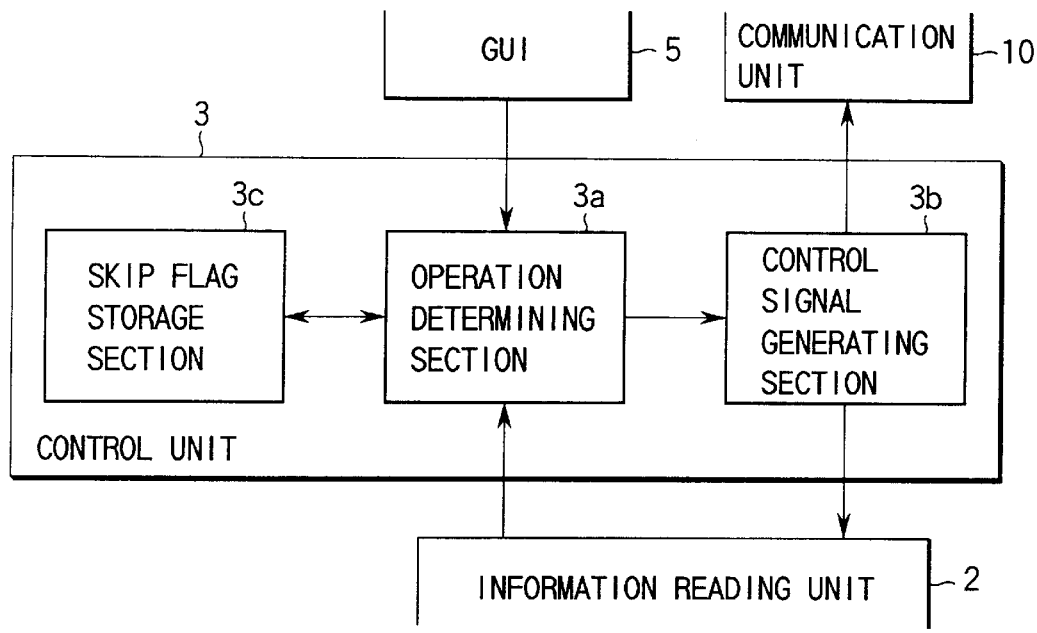
FIG. 21 is a block diagram showing a control unit.

FIG. 21 is a block diagram showing the control unit 3 having a structure similar to that shown in FIG. 4 except for a structure in which a control signal generated by the control signal generating section 3b is output to the communication unit 10 as well as to the information reading unit 2.

The control unit 3 supplies an instruction of reproduction which is classified into three types, that is, an instruction to reproduce a disk, an instruction to reproduce information of the network and an instruction to reproduce combined information.

When the information combining section 2e has received the instruction to reproduce the disk, the information combining section 2e reads information (main information or sub-information) data from the disk input section 2a to transfer information to the reproducing unit 4.

When an instruction to reproduce information of the network has been received, the information combining section 2e reads data of information about the network from the network information input section 2d to transfer data to the reproducing unit 4.

The instruction to reproduce combined information may include the instruction of the method of combining information. For example, a combining method is included with which a computer graphics (CG) image is reproduced on a background formed by image data obtained by the disk input section 2a.

When the information combining section 2e has received the instruction to reproduce combined information, the information combining section 2e reads information data from the disk input section 2a, and then reads data of information of the network from the network information input section 2d. Then, the method instructed with the instruction to reproduce combined information is employed to combine data obtained from the disk input section 2a and the network information input section 2d.

Figure 22:
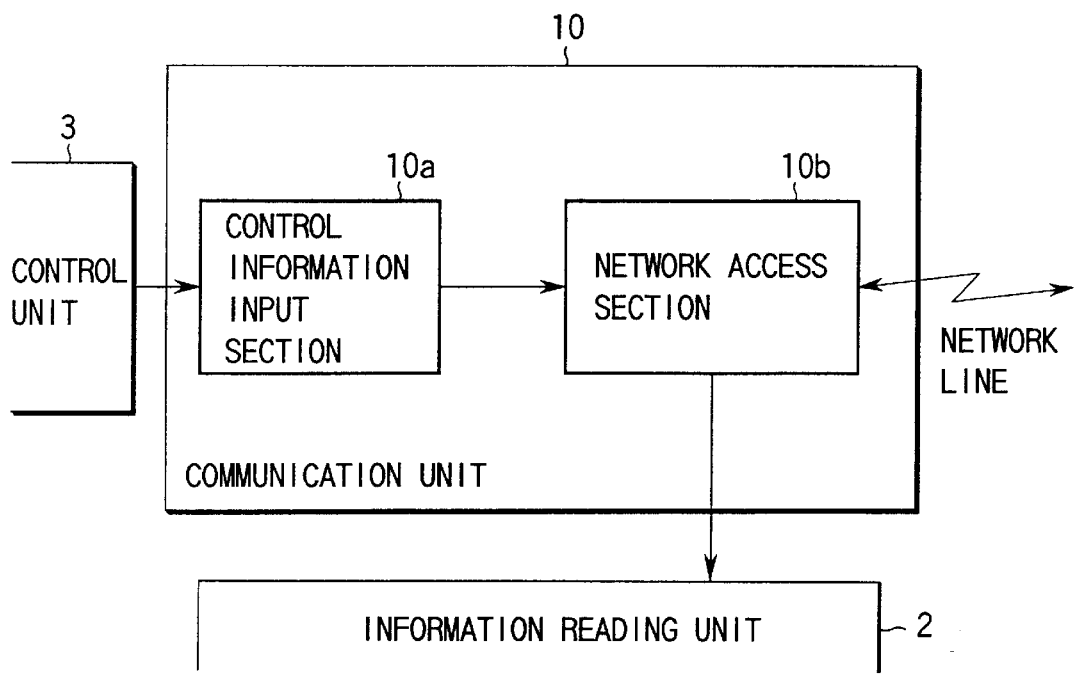
FIG. 22 is a block diagram showing a communication unit.

FIG. 22 is a block diagram showing the communication unit 10 which comprises a control information input section 10a and a network access section (NW access section) 10b.

When the control information input section 10a has received any one of various information (signals) for instructing control from the control unit 3, the control information input section 10a subjects information (the signal) to a predetermined process, and then transfers it to the network access section 10b.

The network access section 10b follows the instruction from the control unit 3 received through the control information input section 10a so that the network access section 10b receives information through the network. Then, the network access section 10b outputs information to the information reading unit 2.

Figure 23:
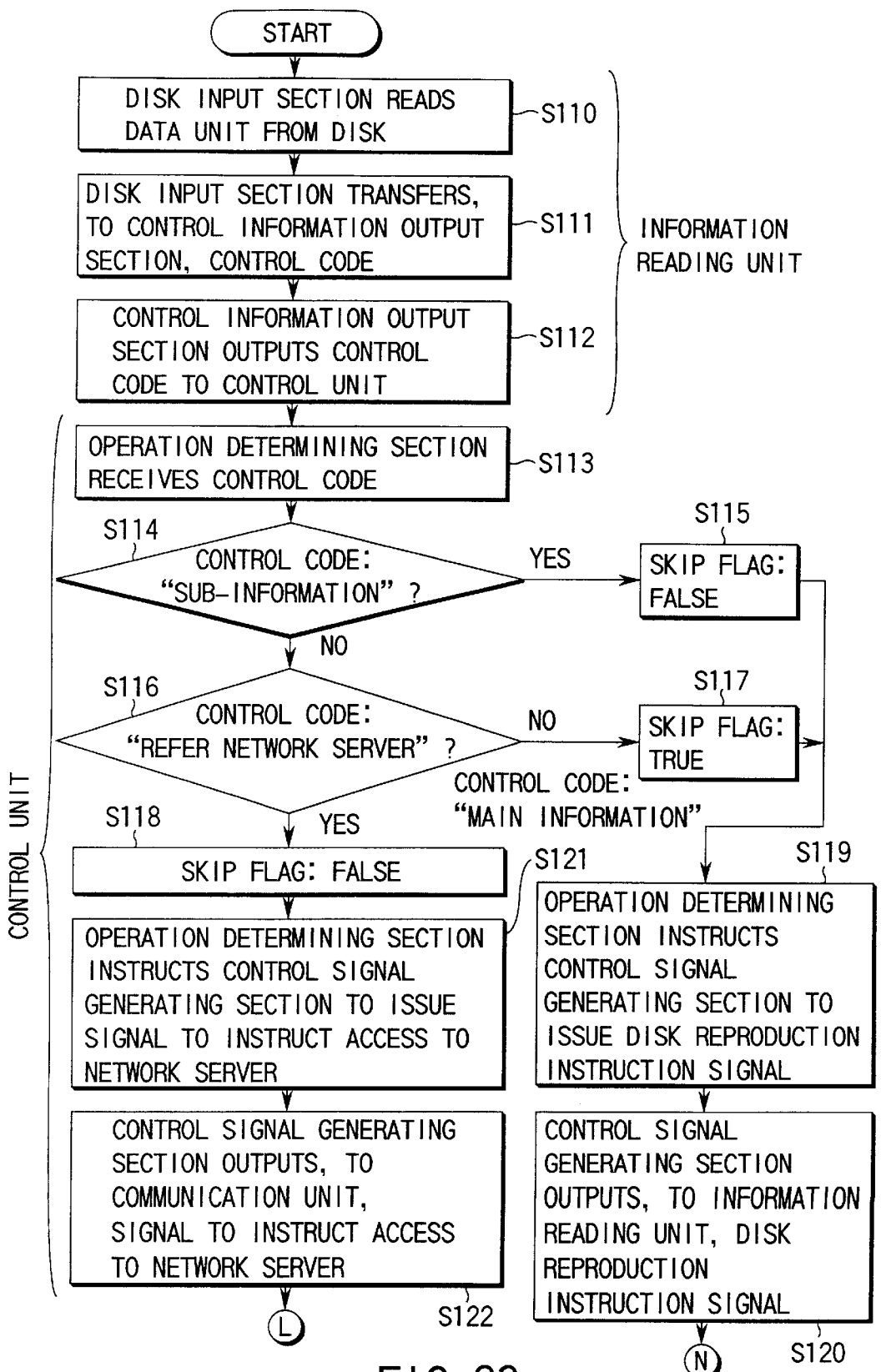
FIG. 23 is a flow chart showing the operation of the information reproducing apparatus.
Figure 24:
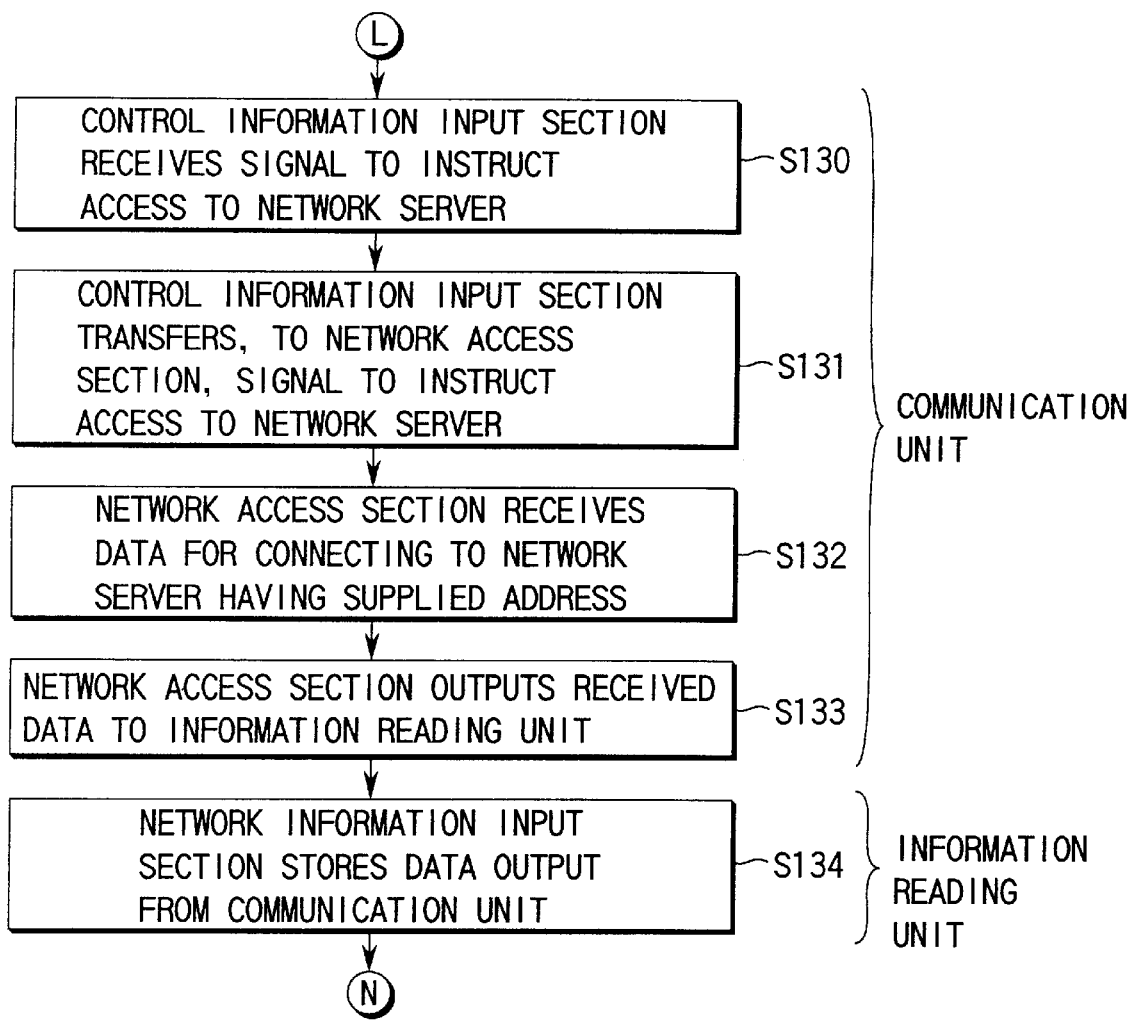
FIG. 24 is a flow chart of the operation (mainly the operation of the communication unit) of the information reproducing apparatus.
Figure 25:
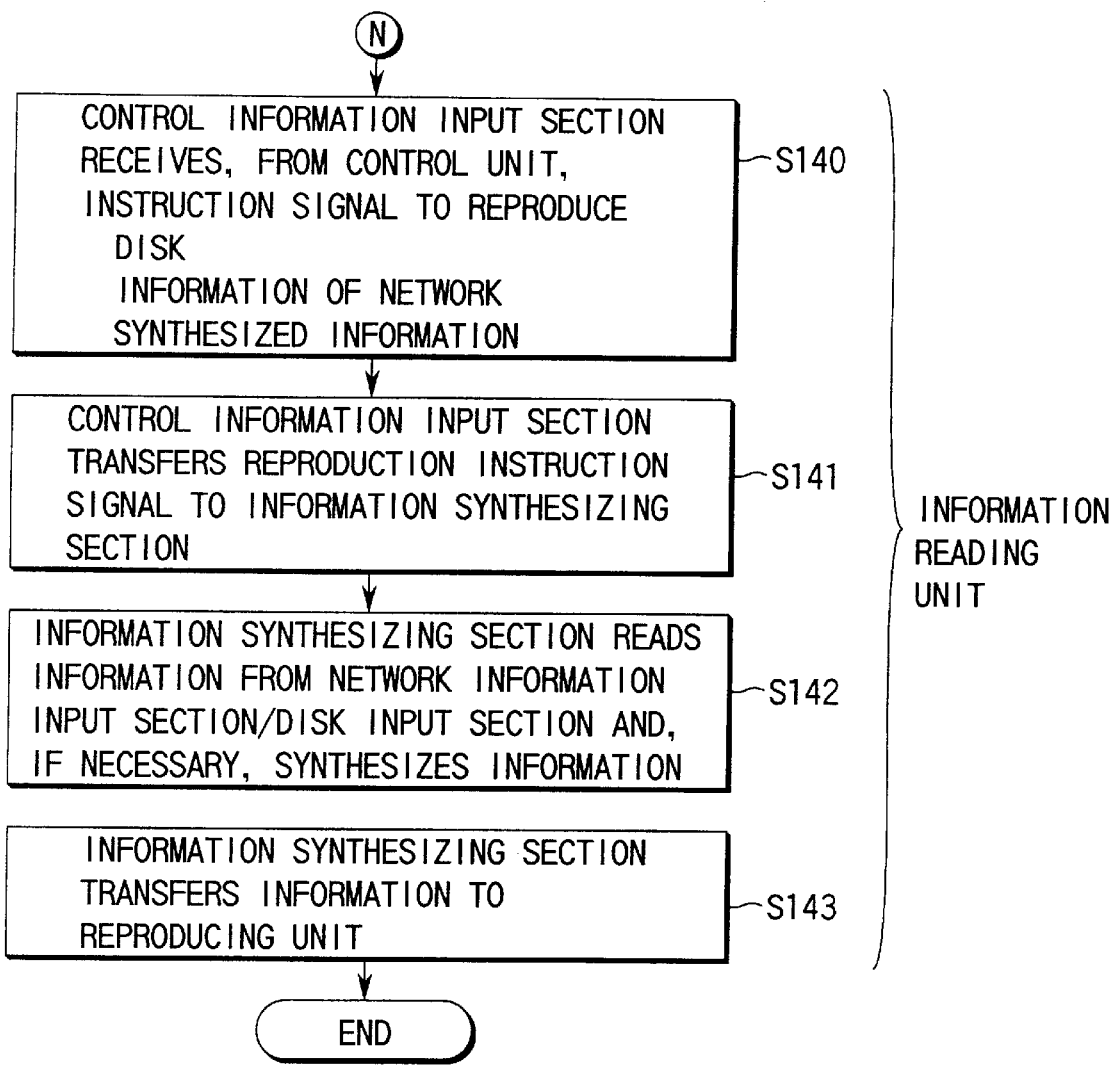
FIG. 25 is a flow chart of the operation (mainly the operation of the information reading unit) of the information reproducing apparatus.

Referring to a flow chart shown in FIGS. 23 to 25, the operation of the information reproducing apparatus shown in FIG. 18 will now be described.

When a user has loaded the disk 1 into a predetermined position in the information reading unit 2, the disk input section 2a reads one data unit from the disk 1 (step S110).

When the disk input section 2a has transferred the control code included in the read data unit to the control information output section 2b (step S111), the control information output section 2b outputs the control code to the control unit 3 (step S112).

The operation determining section 3a of the control unit 3 receives the control code (step S113). If the control code is sub-information code (step S114), the operation proceeds to step S115 so that the skip flag stored in the skip flag storage section 3c is turned on (FALSE). That is, the fast forward movement operation is inhibited.

If the control code is another code (a main information code or a network reference code), the operation proceeds to step S116.

If the control code is the main information code (step S116), the operation proceeds to step S117 so that the skip flag stored in the skip flag storage section 3c is reset (TRUE). That is, the fast forward movement is permitted.

When the control code is the network reference code, the operation proceeds to step S118 so that the skip flag stored in the skip flag storage section 3c is turned on (FALSE). That is, the fast forward movement operation is inhibited.

When the control code is the sub-information code or the main information code, the operation determining section 3a instructs the control signal generating section 3b to issue a signal instructing reproduction of the disk (step S119). The control signal generating section 3b outputs the instruction to reproduce the disk to the information reading unit 2 (step S120).

When the control code is the network reference code, the operation determining section 3a instructs the control signal generating section 3b to issue the address of the network server 11 included in the network reference information and a signal instructing to make an access to the network (step S121). The control signal generating section 3b receives the address and the signal so that the control signal generating section 3b outputs the signal instructing to make an access to the network to the communication unit 10 (step S122).

When the control information input section 10a of the communication unit 10 receives the signal instructing to make an access to the network (step S130 shown in FIG. 24), the signal instructing to make an access to the network is further transferred to the network access section 10b (step S131).

When the network access section 10b has connected to the network server 11 having the supplied address through a predetermined network, the connected network server 11 reads a predetermined information data from a database 12 to transmit information data to the information reproducing apparatus. When the network access section 10b has received information data (step S132), received data (network information) is further output to the information reading unit 2 (step S133).

When the network information input section 2d of the information reading unit 2 receives network information output from the communication unit 10, the network information input section 2d temporarily stores network information (step S134).

Then, the control unit 3 outputs, to the information reading unit 2, the network reproduction instruction signal or combined information reproduction signal at an adequate timing if identification information of information of network is included in the data unit which is identified with the sub-information code which has been read next.

When the control information input section 2c of the information reading unit 2 receives the disk reproduction instruction signal or network information reproduction instruction signal or the combined information reproduction instruction signal output from the control unit 3 (step S140 shown in FIG. 25), it is transferred from the control information input section 2c to the information combining section 2e (step S141).

In accordance with the type of the received reproduction instruction signal, the information combining section 2e reads network information temporarily stored in the network information input section 2d and main information or sub-information read by the disk input section 2a, and then performs combining or the like in accordance with the type of the reproduction instruction signal (step S142) to output it to the reproducing unit 4 (step S143).

When an access is made to a network, a longer time is sometimes taken as compared with time required to read a disk. Therefore, it is preferable that the data unit including the network reference code for instructing an access to the network is positioned sufficiently forward of the position of sub-information at which network information is actually required.

The address of the network server to which an access is made may be stored in the control signal generating section 3b. In this case, the network server access instruction signal, which is output from the control signal generating section 3b to the communication unit 10 when the operation determining section 3a has instructed the control signal generating section 3b to issue the network server access instruction signal in step S121 shown in FIG. 23, may include the address of the network server to which the access is made.

There is sometimes a case where information stored in the information reproducing apparatus is required to be changed from the network server 11. For example, when the information reproducing apparatus reads the network server reference code, the address of the server, which has been stored in the control signal generating section 3b and to which an access is made, is sometimes required to be changed.

In actual, a great load is required for the communication line and the server apparatus if a multiplicity of information reproducing apparatuses simultaneously make accesses to the network server 11. To disperse the load, the unit for reading the network information must be changed.

Figure 26:
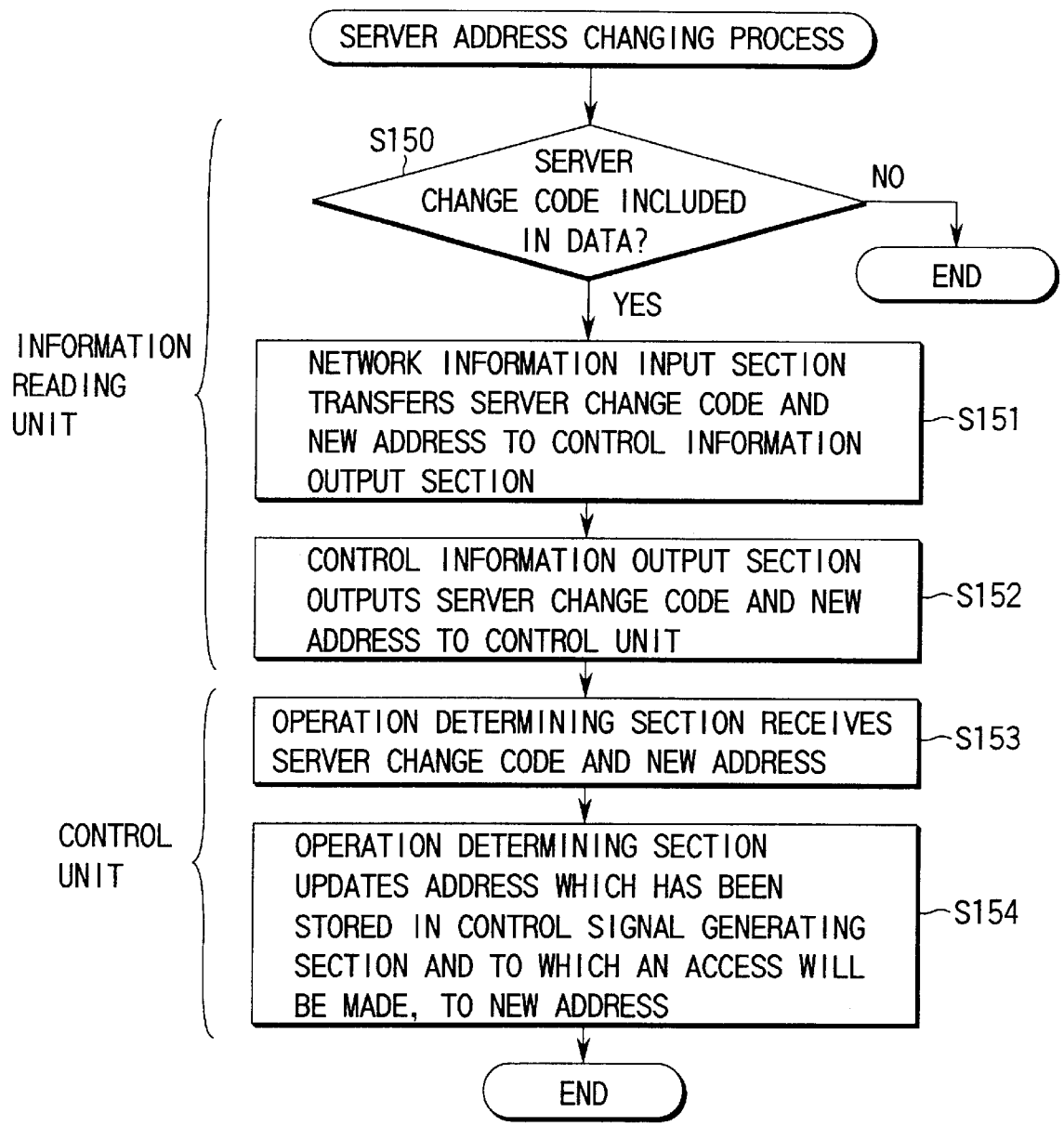
FIG. 26 is a flow chart of a process for changing the server address which is stored in a control signal generating section of the control unit and to which an access is made.

The operation of changing the address of the network server previously stored in the information reproducing apparatus shown in FIG. 18 will now be described with reference to a flow chart shown in FIG. 26.

As described above (step S132 shown in FIG. 24), network information data transferred from the network server 11 has been stored in the network information input section 2d of the information reading unit 2 on the basis of the network server reference code on the disk 1. A server changing code for changing the server to which an access is made and the address of a server to which a new access is made may be described in data.

When the network information input section 2d receives information of the network, the network information input section 2d checks whether or not the code for changing the server is included in information of the network (step S150). If the code is included, the code for changing the server and new address are transferred to the control information output section 2b (step S151). When the control information output section 2b, which has received the code and the address, outputs, to the control unit 3, the code for changing the server and the address of the server to which a new access is made (step S152), the operation determining section 3a of the control unit 3 receives the code and the address (step S153), and then updates the address of the server, which has been stored in the control signal generating section 3b and to which an access is made, to new address (step S154).

Figure 7:
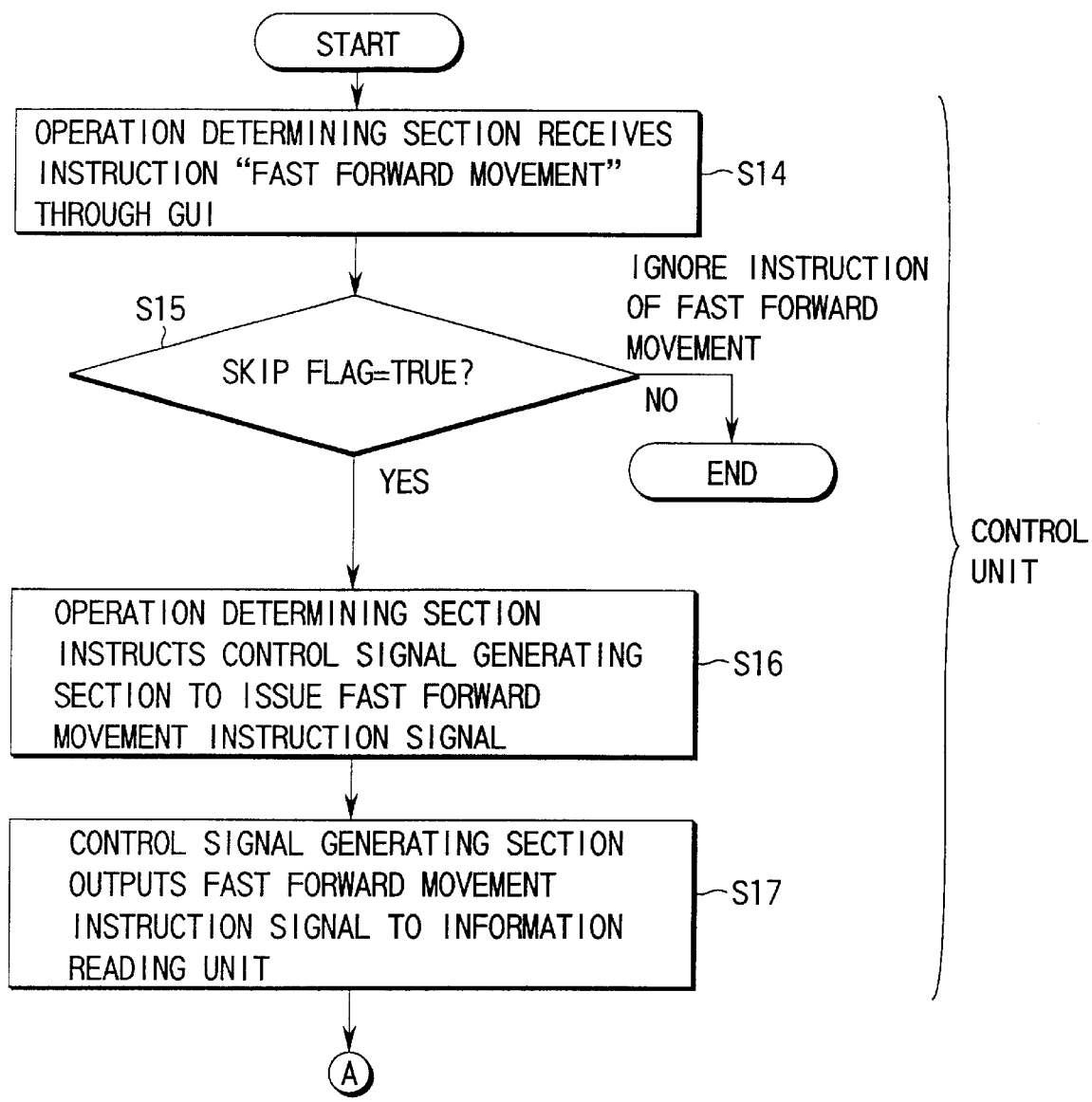
FIG. 7 is a flow chart of the operation of the information reproducing apparatus according to the first embodiment of the present invention.

The operation, which is performed by the information reproducing apparatus shown in FIG. 20 when the instruction of "fast forward movement of the disk" has been instructed through the GUI 5, is similar to that described in the flow chart shown in FIG. 7.

As described above, according to the third embodiment, the control code included in the data unit on the disk 1 is checked by the operation determining section 3a of the control unit 3.

The control unit 3 instructs the information reading unit 2 to reproduce information (main information or sub-information) on the disk 1, reproduce information (sub-information) obtained through the network or reproduce information obtained by combining the above-mentioned information in accordance with the type of the control code.

As a result, important sub-information for supplementing main information or important sub-information relating to the sponsor of main information can reliably be presented to a user. Moreover, a commercial (sub-information) including up-to-date information can easily be displayed if necessary during reproduction of the disk 1.

Fourth Embodiment

An information reproducing apparatus according to a fourth embodiment of the present invention will now be described.

Figure 27:
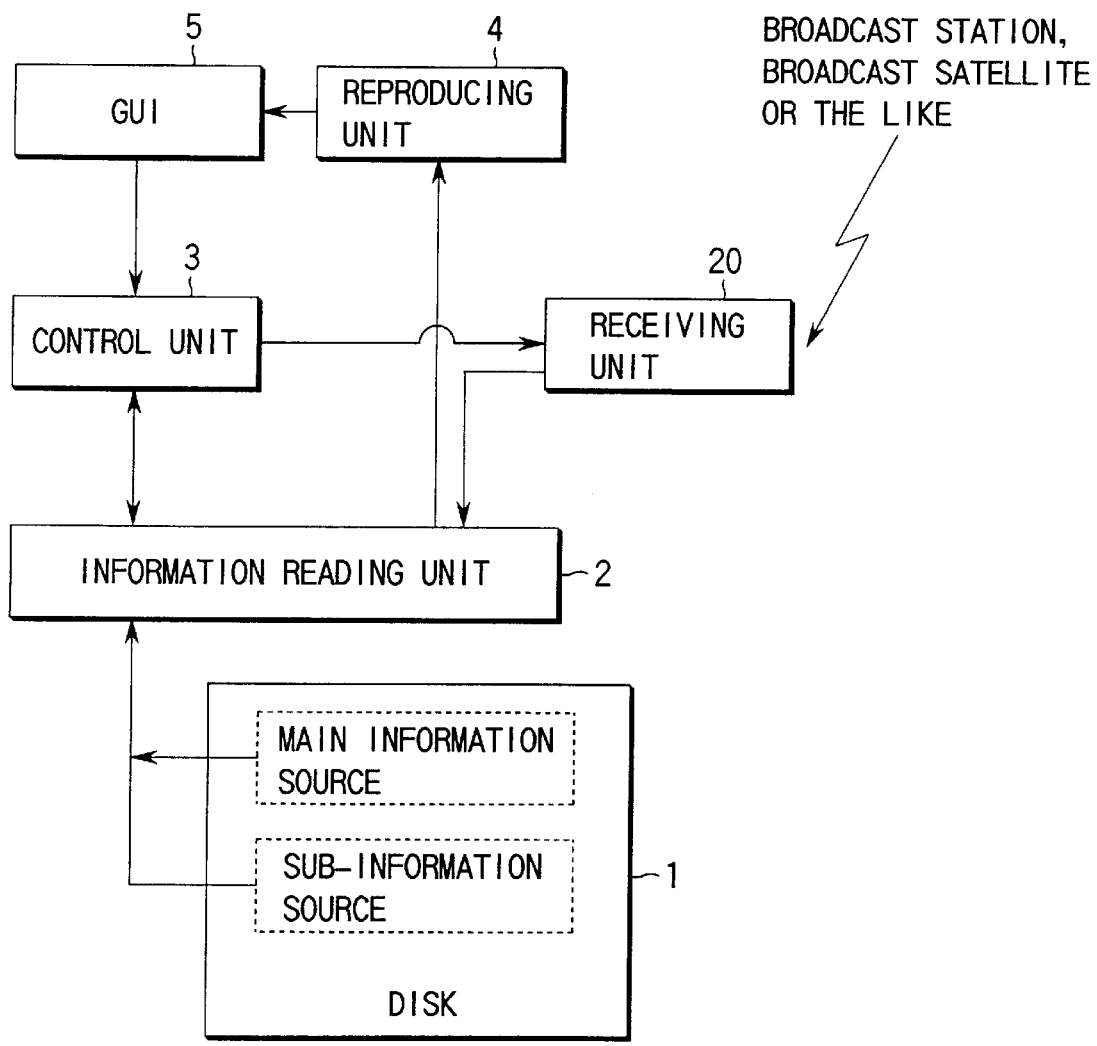
FIG. 27 is a block diagram showing an information reproducing apparatus according to a fourth embodiment of the present invention.

FIG. 27 is a diagram showing the information reproducing apparatus according to the fourth embodiment of the present invention. The same elements as those shown in FIG. 18 are given the same reference numerals, and the different elements will now be described. That is, a receiving unit 20 is substituted for the communication unit 10 shown in FIG. 18.

The receiving unit 20 receives a broadcast signal transmitted from a predetermined broadcast station or a broadcast satellite and corresponding to the date, the day of the week, time and channel and the like instructed by the control unit 3 so as to transmit it to the information reading unit 2 as broadcast information.

Figure 28A:
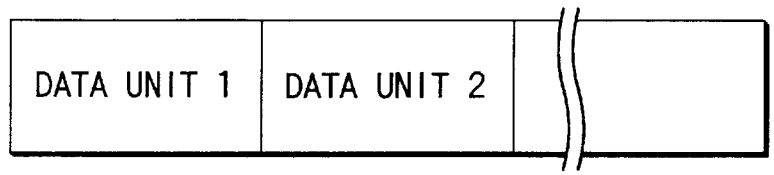
FIG. 28A is a diagram showing the format of record in an information recording medium for use in the information reproducing apparatus according to the fourth embodiment of the present invention.
Figure 28B:
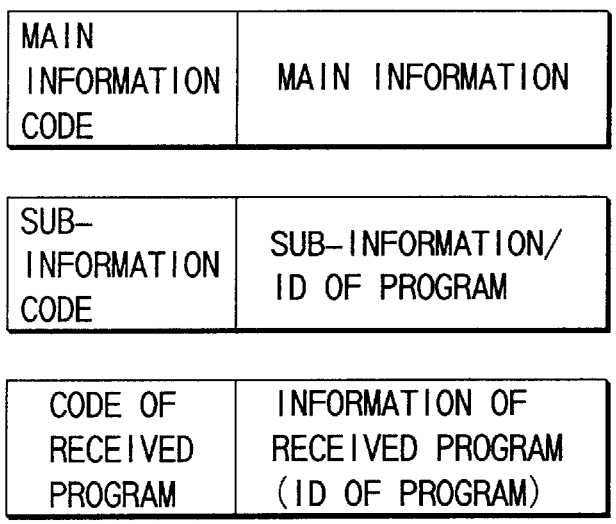
FIG. 28B is a diagram showing the format of record in an information recording medium for use in the information reproducing apparatus according to the fourth embodiment of the present invention.
Figure 28C:
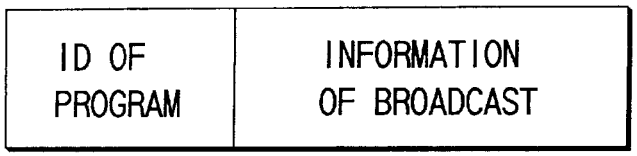
FIG. 28C is a diagram showing the format of record in an information recording medium for use in the information reproducing apparatus according to the fourth embodiment of the present invention.

FIGS. 28A to 28C are diagrams showing the format of record for use in the information reproducing apparatus according to the fourth embodiment of the present invention.

The format of record of information on the information recording medium 1 is, as shown in FIG. 28A, composed of data units each having a predetermined length. The data unit is one reading unit. Each data unit is classified into three types, as shown in FIG. 28B.

That is, the data unit has a data unit having main information stored therein, a data unit having sub-information stored therein and a data unit having information (information of received program) required to receive a broadcast program.

Each data unit is composed of a control code storage section for storing a control code for distinguishing main information, sub-information and information of a program to be received from each other and an information storage section for storing main information data, sub-information data and information of the program to be received to have a predetermined length.

Information of received program includes one or more information (ID of a program) of broadcast information which must be reproduced.

In this case, an assumption is performed that the receiving unit 20 has been tuned to, for example, a predetermined commercial only broadcast. Broadcast information which is received and obtained as a broadcast signal includes the ID of a program, as shown in FIG. 28C.

The sub-information code or sub-information may include a broadcast information reference code for instructing reproduction of broadcast information and the program ID of broadcast information which must be reproduced.

Figure 29:
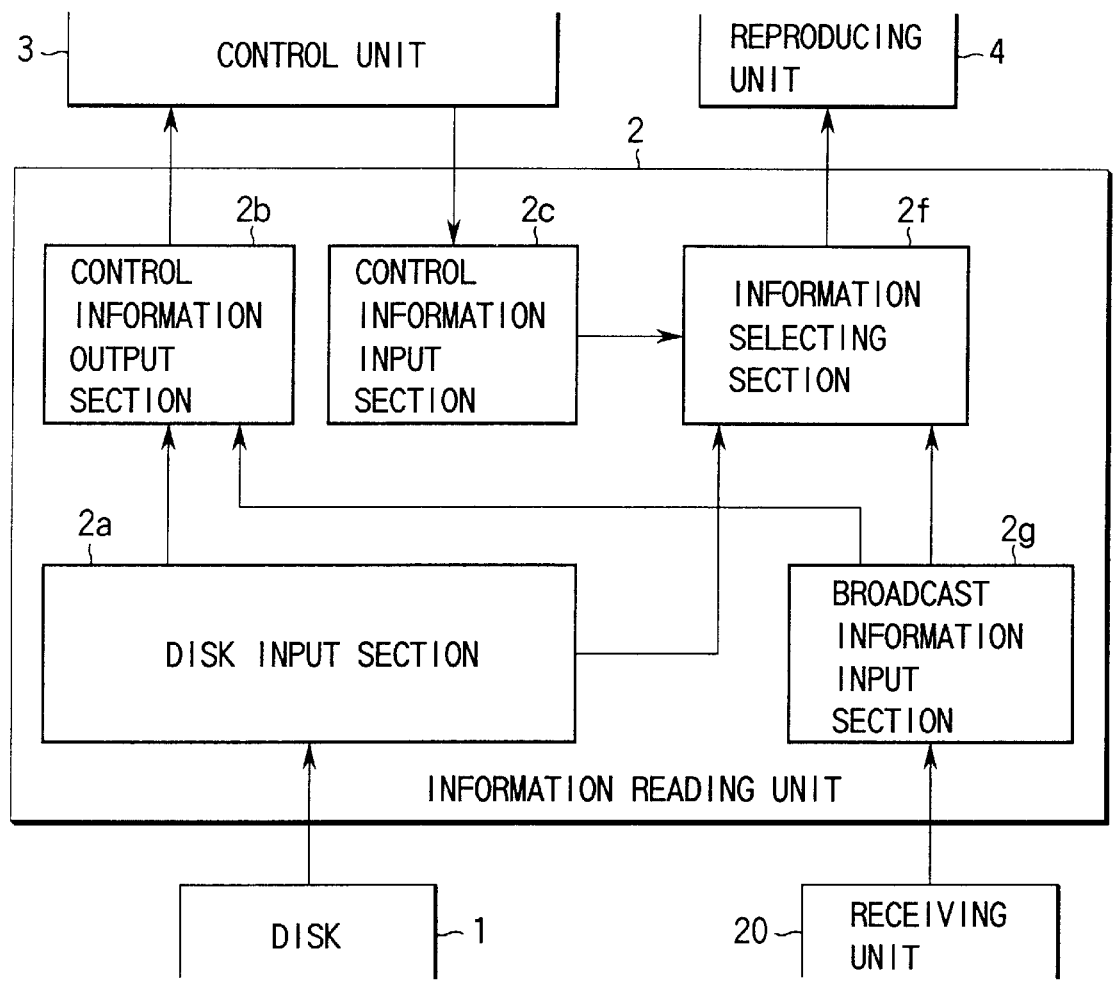
FIG. 29 is a block diagram showing an information reading unit.

FIG. 29 shows the information reading unit 2. The same elements as those shown in FIG. 20 are given the same reference numerals, and different elements will now be described. That is, an information selecting section 2f is substituted for the information combining section 2e; and a broadcast information input section 2g is substituted for the network information input section 2d.

The broadcast information input section 2g receives, from the receiving unit 20, broadcast information received by the receiving unit 20, and then subjects it to a predetermined information process. Then, the broadcast information input section 2g transfers broadcast information to the information selecting section 2f.

The information selecting section 2f is controlled by the control unit 3 to select either broadcast information supplied to the broadcast information input section 2g or information read from the disk 1 by the disk input section 2a.

Figure 30:
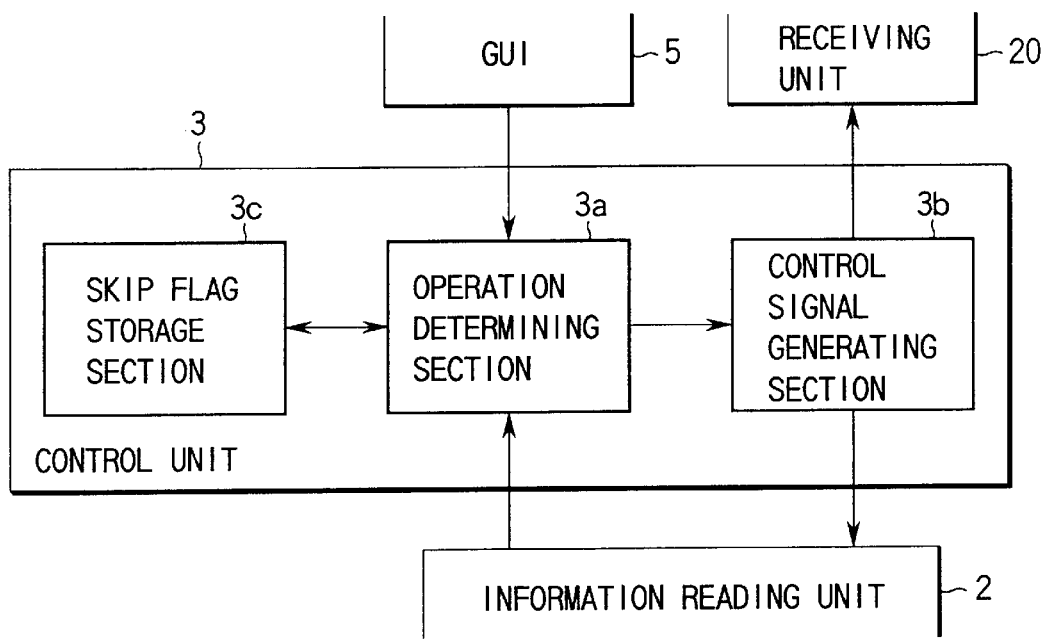
FIG. 30 is a block diagram showing a control unit.

FIG. 30 shows the control unit 3 which has a structure similar to that shown in FIG. 4 except for the control signal generated by the control signal generating section 3b being output to the receiving unit 20 as well as to the information reading unit 2.

Figure 31:
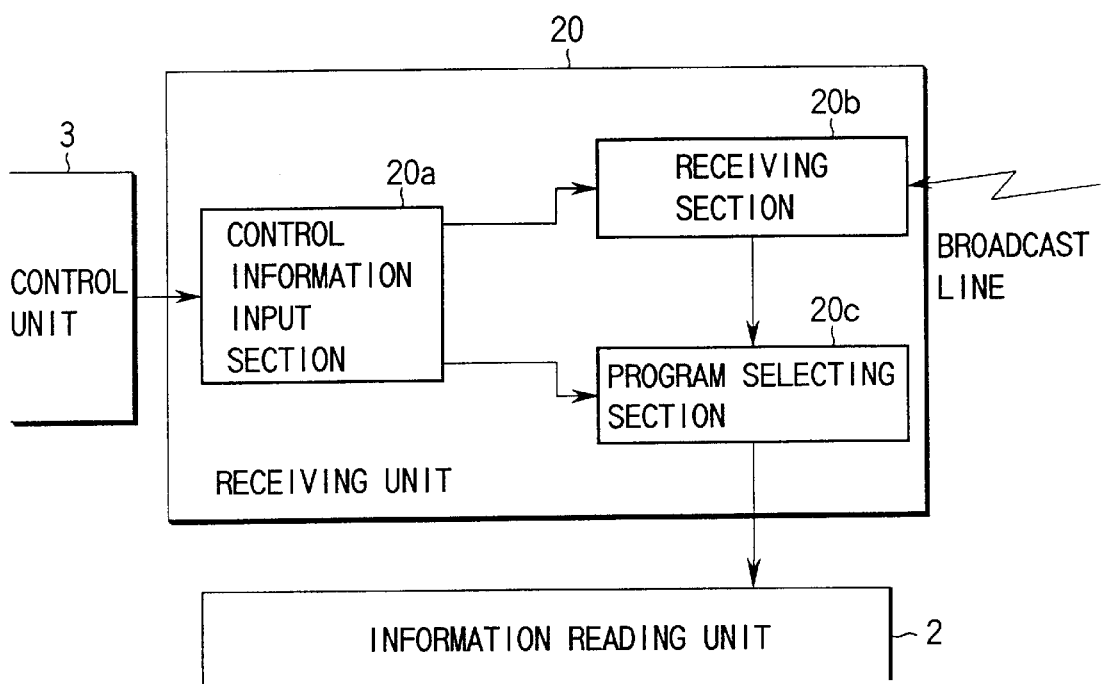
FIG. 31 is a block diagram showing a receiving unit.

FIG. 31 shows the receiving unit 20 which comprises a control signal input section 20a, a receiving section 20b and a program selecting section 20c.

The control signal input section 20a receives a control instruction signal (control information) from the control unit 3, and then transfers it to the receiving section 20b and the program selecting section 20c.

The receiving section 20b has been tuned to a predetermined commercial only broadcast. The receiving section 20b receives a receipt start instruction signal transferred from the control unit 3 through the control signal input section 20a, and then receives a broadcast signal. Then, the receiving section 20b transfers broadcast information to the program selecting section 20c.

The program selecting section 20c selects broadcast information transferred from the receiving section 20b in accordance with information about the received program transferred from the control unit 3 through the control signal input section 20a, and then outputs selected broadcast information to the information reading unit 2.

The program selecting section 20c may be arranged to store the program ID included in information of the program to be received as a list of selectable programs to select broadcast information.

An assumption is performed that one of ID stored in a program selection list is "01003***". At this time, broadcast information having program ID "01003211" and received by the receiving section 20b is output to the information reading unit 2.

Referring to a flow chart shown in FIGS. 32 to 34, the operation of the information reproducing apparatus shown in FIG. 27 will now be described.

When a user loads the disk 1 into a predetermined position in the information reading unit 2, the disk input section 2a reads a data unit from the disk 1 (step S160).

When the control code included in the data unit read by the disk input section 2a has been transferred to the control information output section 2b (step S161), the control information output section 2b outputs the control code to the control unit 3 (step S162).

The operation determining section 3a of the control unit 3 receives the control code (step S163). If the control code is a code for receiving a program (step S164), the operation proceeds to step S165 so that the operation determining section 3a outputs information of a program which is included in the data unit through the control signal generating section 3b (steps S165 and S166).

Figure 33:
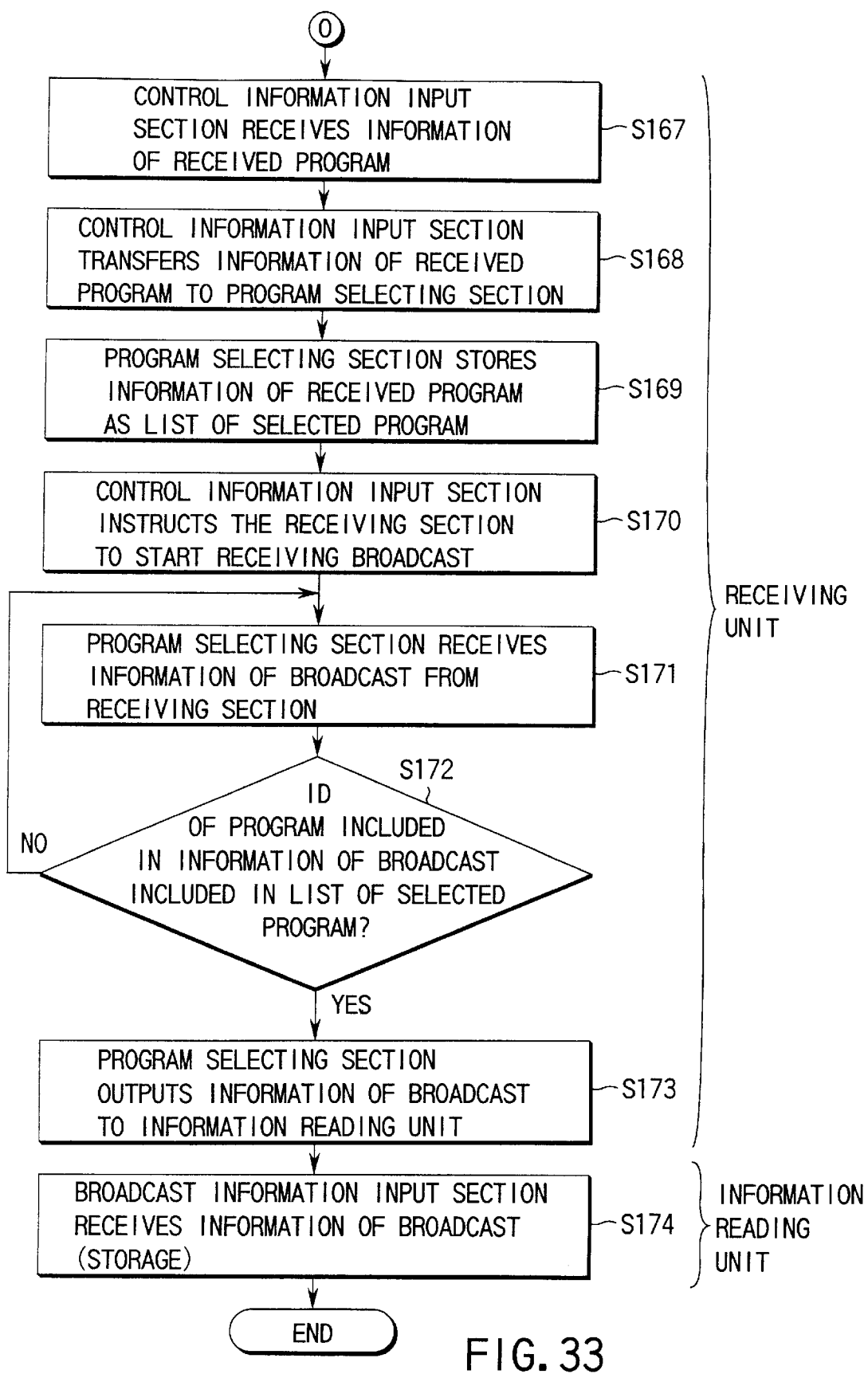
FIG. 33 is a flow chart of the operation (mainly the operation of the receiving unit) of the information reproducing apparatus shown in FIG. 27.

When the control signal input section 20a of the receiving unit 20 receives program information, the control signal input section 20a further transfers the program information to the program selecting section 20c (steps S167 and S168 shown in FIG. 33).

The program selecting section 20c stores the ID of the program included in the program information as a list of selectable programs (step S169).

Then, a signal instructing start of receiving broadcast is supplied from the control unit 3 to the receiving section 20b through the control signal input section 20a at an adequate timing so that receipt of the broadcast signal is started (step S170).

Whenever broadcast information is transferred from the receiving section 20b, the program selecting section 20c checks whether or not program ID is included in the list of the selectable programs (steps S171 to S172).

Only broadcast information having the program ID included in the list of the selectable programs is selected by the program selecting section 20c, and then output to the information reading unit 2. Then, selected broadcast information is received by the broadcast information input section 2g (steps S173 and S174).

Figure 32:
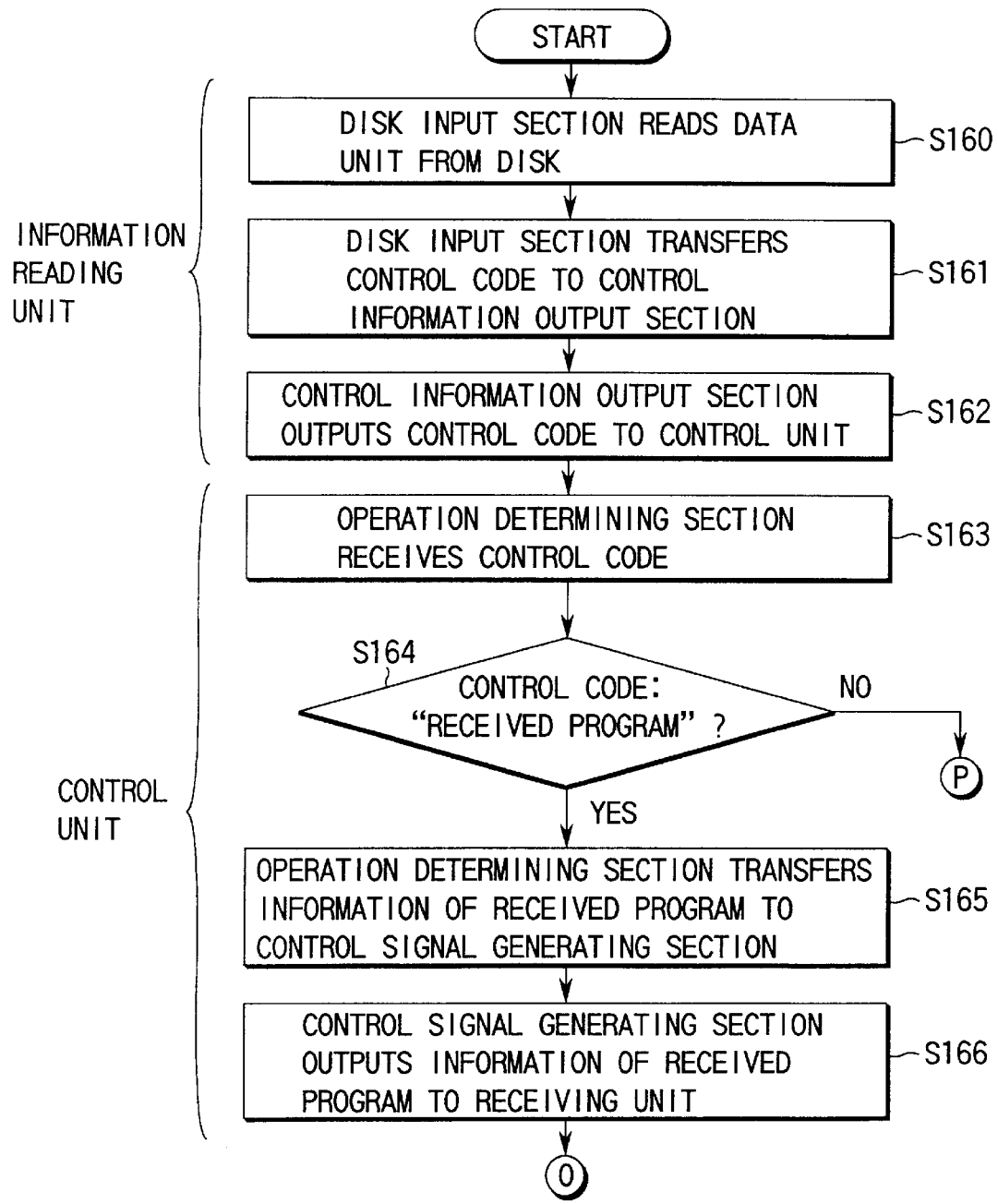
FIG. 32 is a flow chart of the operation (mainly the operation of the information reading unit and the control unit) of the information reproducing apparatus shown in FIG. 27.
Figure 34:
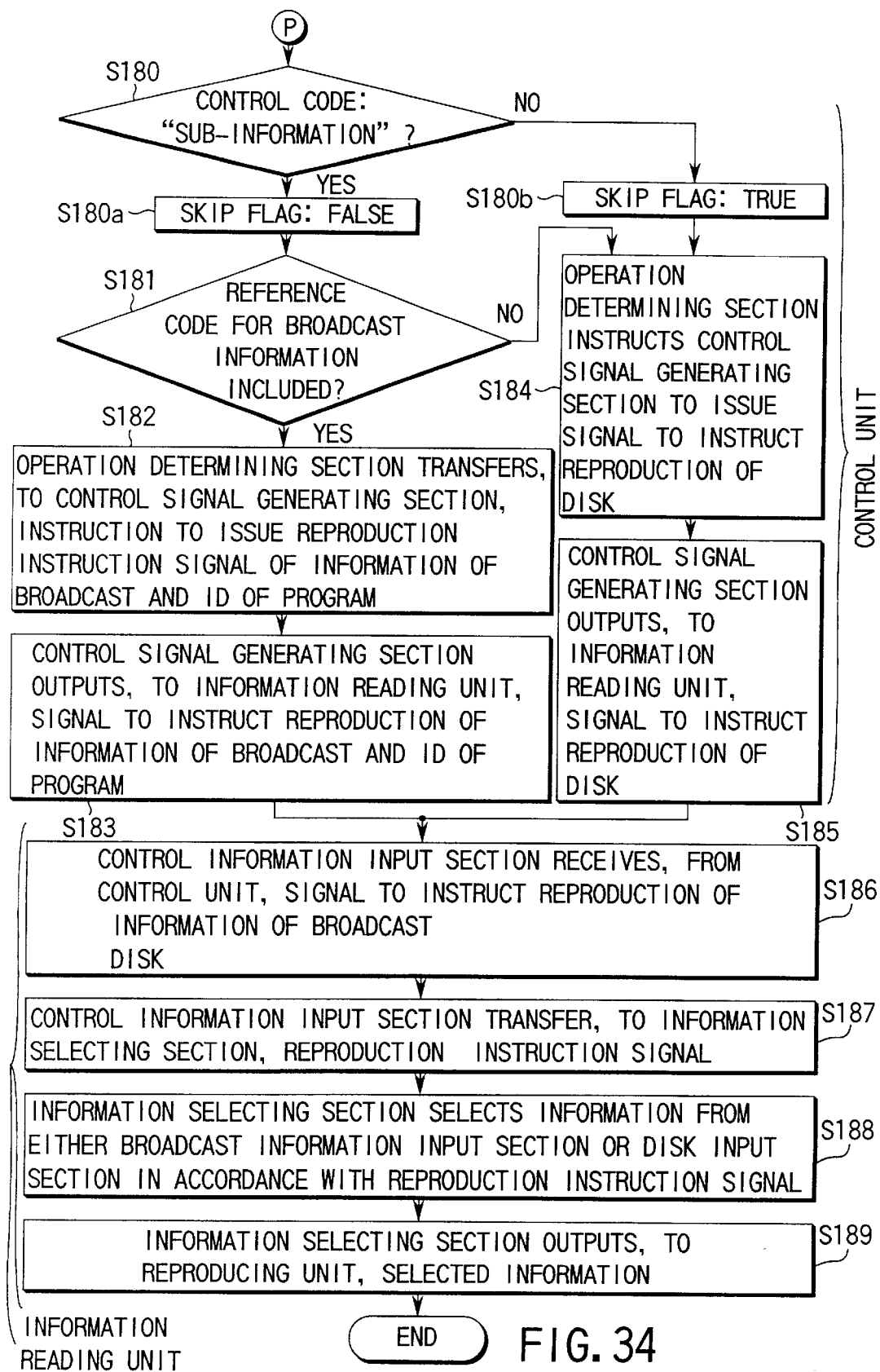
FIG. 34 is a flow chart of the operation (mainly the operations of the control unit and the information reading unit) of the information reproducing apparatus shown in FIG. 27.

If the control code is a main information code or a sub-information code in step S164 shown in FIG. 32, the operation proceeds to step S180 shown in FIG. 34.

When the control code is the sub-information code, the skip flag stored in the skip flag storage section 3c is turned on (FALSE). That is, the fast forward movement operation is inhibited (step S180a).

When the control code is the main information code, the operation proceeds to step S117 so that the skip flag stored in the skip flag storage section 3c is reset (TRUE). That is, the fast forward movement operation is permitted (step S180b).

If the control code is the sub-information code, whether or not broadcast information reference code is included in sub-information is checked (step S181).

If broadcast information reference code is included, the operation determining section 3a outputs the program ID included in, for example, sub-information to the information reading unit 2 through the control signal generating section 3b together with the signal for instructing reproduction of broadcast information (steps S182 and S183).

If the control code is the sub-information code which does not include the sub-information code and broadcast information reference code, the operation determining section 3a outputs a reproduction instruction signal (a disk reproduction instruction signal) of information recorded on the disk 1 to the information reading unit 2 through the control signal generating section 3b (steps S184 and S185).

When the information selecting section 2f receives broadcast information reproduction instruction signal or disk reproduction instruction signal through the control information input section 2c of the information reading unit 2 (steps S186 and S187), the information selecting section 2f selects information from either the broadcast information input section 2g or the disk input section 2a in response to the reproduction instruction signal (step S188), and then outputs the selected information to the reproducing unit 4 (step S189).

Figure 35:
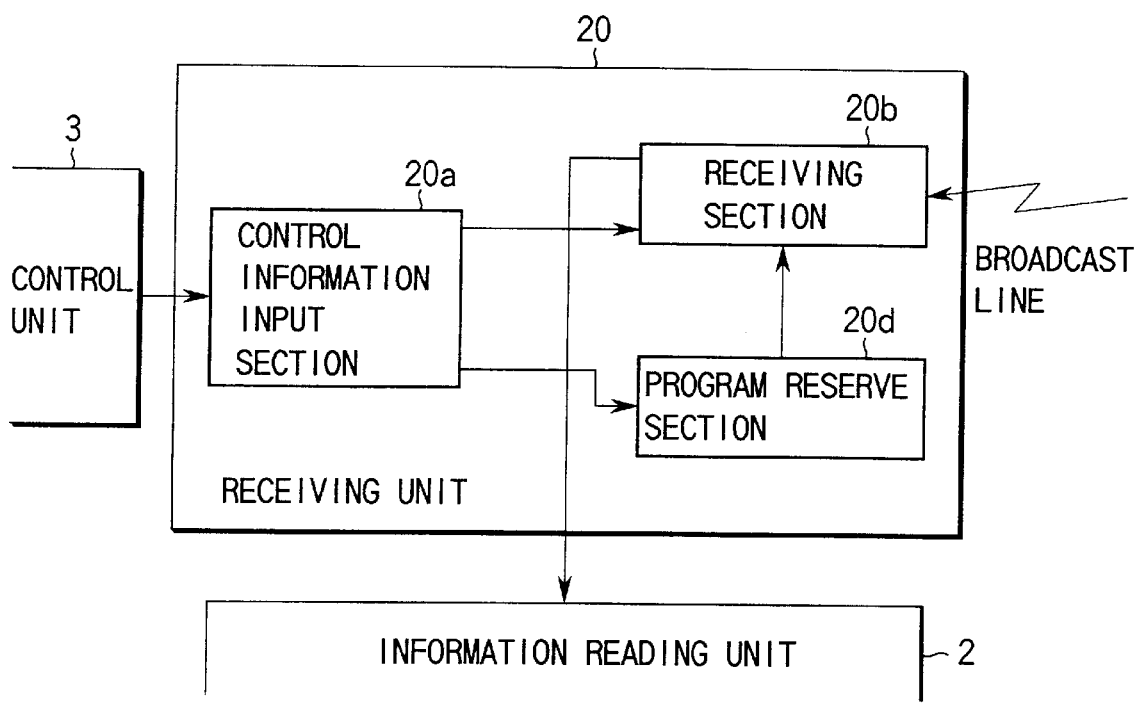
FIG. 35 is a block diagram showing another receiving unit.

Another structure of the receiving unit 20 will now be described with reference to FIG. 35. FIG. 35 shows a structure in which a program reservation section 20d is substituted for the program selecting section 20c in the structure shown in FIG. 31.

In this case, program information includes the following information items so that one program ID is made to correspond to one broadcast program (for example, a commercial) which is periodically broadcast every week.

(program ID, (channel, a day of the week, start time:end time), (channel, a day of the week, start time:end time), ... ).

The program reservation section 20d receives the above-mentioned program information from the information reading unit 2 through the control unit 3 so as to store it as a list of reserved programs. In accordance with the contents of the list, the broadcast signal of the instructed program is received so as to be transferred to the broadcast information input section 2g of the information reading unit 2.

The broadcast information input section 2g stores broadcast information transferred from the receiving unit 20.

Figure 36:
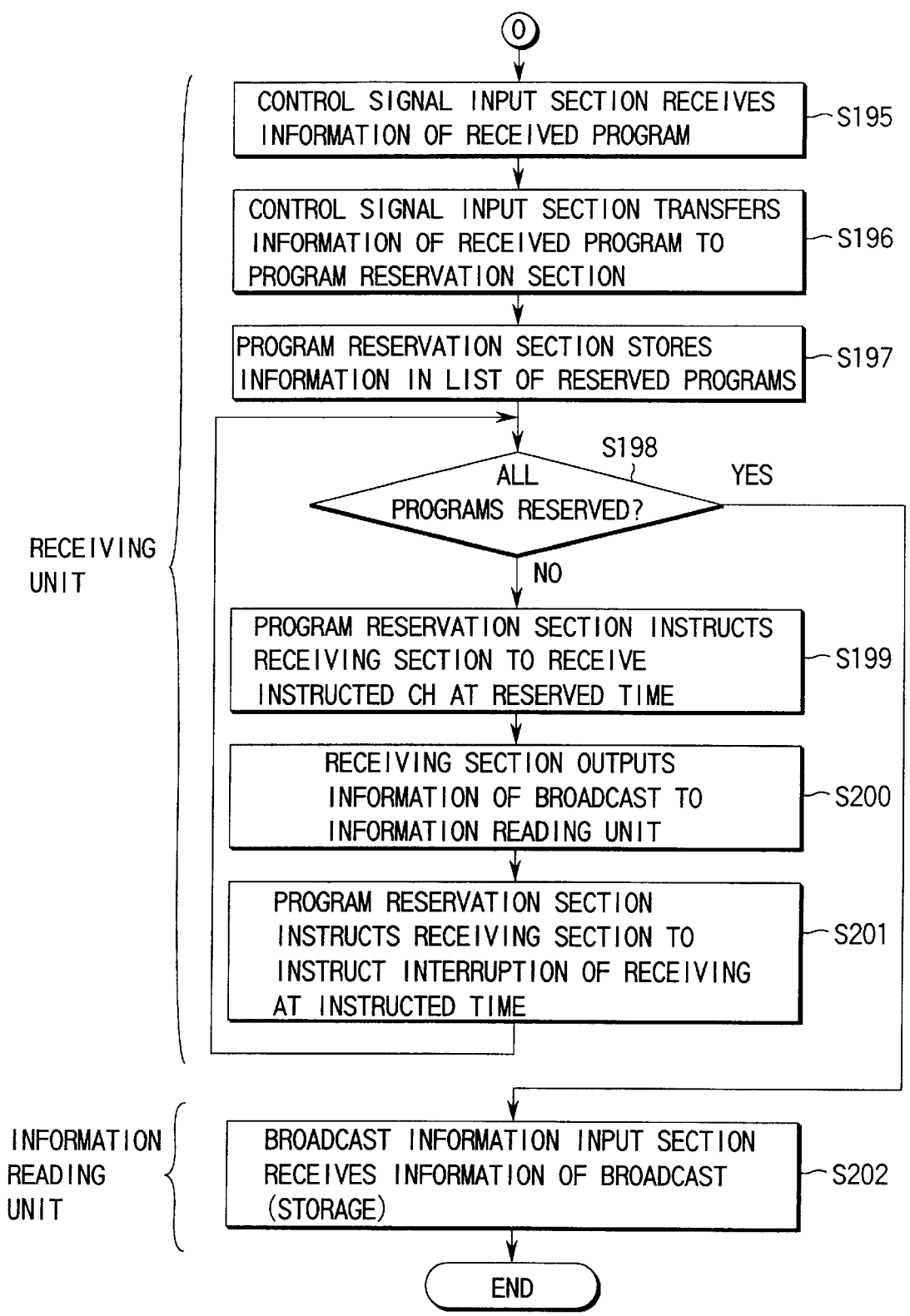
FIG. 36 is a flow chart of the operation of the receiving unit shown in FIG. 35.

Referring to a flow chart shown in FIG. 36, the operation of the receiving apparatus having the structure shown in FIG. 35 will now be described.

When program information, which has been, in step S166 shown in FIG. 32, output from the control signal generating section 3b to the receiving unit 20 is received by the control signal input section 20a of the receiving unit 20 (step S195), it is further transferred to the program reservation section 20d (step S196). The contents are stored in the list of reserved programs (step S197).

Then, the receiving unit 20 instructs the receiving section 20b to receive all of programs reserved with the program information or to interrupt receiving of the program in accordance with the reserved time and/or the channel stored in the list of the reserved programs.

The receiving section 20b receives the instructed broadcast signal until it receives an instruction to interrupt receipt from the program reservation section 20d, and then outputs the broadcast signal to the information reading unit 2 (steps S198 to S201).

The broadcast information input section 2g of the information reading unit 2 is arranged to store broadcast information transferred from the receiving unit 20 (step S202). The following operation is similar to that in steps S160 to S164 (see FIG. 32) and steps S180 to S189 (see FIG. 34).

As described above, the sub-information code sometimes includes the broadcast information reference code. It can be interpreted as an instruction to select a program having the ID from the broadcast information input section 2g and to reproduce the program.

If the sub-information code includes the broadcast information reference code and sub-information has the instructed program ID, broadcast information corresponding to the ID must already be received and stored in the broadcast information input section 2g.

Therefore, an assumption is performed that each broadcast information is repeatedly broadcast at sufficiently short intervals. To make this to be further reliable, a reference may be made to a commercial having a long broadcast period after the disk reproduction time has elapsed.

If broadcast information having the ID is not stored in the broadcast information input section 2g, a commercial on the disk which is reproduced as an alternative to it may be instructed as sub-information data.

The operation which is performed by the information reproducing apparatus shown in FIG. 27 when the user instructs "fast forward movement of the disk" through the GUI 5 is similar to the flow chart shown in FIG. 7.

As described above, according to the fourth embodiment, the control code included in the data unit on the disk 1 is checked by the operation determining section 3a of the control unit 3.

The control unit 3 instructs the information reading unit 2 to reproduce information (main information or sub-information) on the disk 1 or to reproduce broadcast information received by the receiving unit 20 in accordance with the type of the control code.

As a result, important sub-information (for example, a commercial) for supplementing main information or important sub-information relating the sponsor can reliably be presented to a user. Moreover, a commercial (sub-information) including up-to-date can easily be displayed during reproduction of the disk 1.

As described above, according to the present invention, important sub-information for supplementing main information or important information relating to a sponsor can reliably be presented to a user during reproduction of main information, such as a movie recorded on an information recording medium. Therefore, the cost of the information recording medium, such as the DVD, can be reduced.

The above-mentioned contrivance described in each of the embodiments may be, as a program which can be executed by a computer, written on, for example, a magnetic disk (a floppy disk or a hard disk) or an optical disk (a CD-ROM or a DVD) or a semiconductor memory so as to be applied to various apparatuses. As an alternative to this, it may be transferred through a communication medium so as to be applied to various apparatuses.

In this case, the information reproducing apparatus according to this embodiment reads the program recorded on the recording medium and the operation of the information reproducing apparatus is controlled so that the above-mentioned process is realized.

Although the information reproducing apparatus has been described in each of the embodiments, the structures which can be understood in each embodiment may, of course, be combined with each other.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information reproducing apparatus comprising:
    a reading section configured to read main information, sub-information and a control code for distinguishing the main information and the sub-information from each other from an information recording medium on which the main information, the sub-information and the control code are recorded;
    a reproducing section configured to reproduce the main information and sub-information read by said reading section; and
    a first inhibition section configured to inhibit a request for interruption of sub-information reproduction by said reproducing section.

2. The information reproducing apparatus according to claim 1, wherein said information recording medium is a DVD.

3. The information reproducing apparatus according to claim 1, wherein said first inhibition section comprises:
    a determination section configured to determine whether or not the control code read by said reading section indicates the sub-information;
    a first setting section configured to set a skip flag to be a first value in a case where said determination section determines that said control code indicates the sub-information; and
    a second inhibition section configured to inhibit a request for interruption of sub-information reproduction in a case where said skip flag is to be said first value by said first setting section.

4. The information reproducing apparatus according to claim 3, further comprising:
    a second setting section configured to set said skip flag to be a second value in a case where said determining section determines that said control code indicates the main information; and
    a section configured to fast-forward move main information which is being reproduced by said reproducing section in a case where fast forward movement is instructed by a user and said skip flag is set to be said second value by said second setting section.

5. The information reproducing apparatus according to claim 1, wherein
    said main information is information of described contents of a movie, and sub-information is information of described commercial from a sponsor of said movie.

6. A first storage medium having program code instructions stored thereon when executed by a processor, said instructions comprising:
    means for causing said processor to read main information, sub-information and a control code for distinguishing the main information and the sub-information from each other from a second storage medium on which the main information, the sub-information and the control code are recorded;
    means for causing said processor to reproduce read main information and sub-information; and
    means for causing said processor to inhibit a request for interruption of sub-information reproduction in a case where the sub-information is being reproduced.

7. An information reproducing apparatus comprising:
    a reading section configured to read main information, sub-information, network reference information and a control code from an information recording medium on which the main information, the sub-information, the network reference information indicating a network server, to which an access is made, and which indicates whether or not the main information and the network information are combined with each other and whether or not the sub-information and the network information are combined with each other, and the control code for distinguishing the main information, the sub-information and the network reference information, are recorded;
    an acquiring section configured to acquire network information from said network server in accordance with the network reference information read by said reading section;
    a first combining section configured to combine the network information acquired by said acquiring section and the sub-information read by said reading section with each other in a case where the network reference information read by said reading section indicates that the sub-information and the network information are combined with each other; and
    a first reproducing section configured to reproduce information combined by said first combining section.

8. The information reproducing apparatus according to claim 7 further comprising:
    a second combining section configured to combine the network information acquired by said acquiring section and the main information acquired by said reading section with each other in a case where the network reference information read by said reading section indicates that the main information and the network information are combined with each other; and
    a second reproducing section configured to reproduce information combined by said second combining section.

9. The information reproducing apparatus according to claim 7, wherein said information recording medium is a DVD.

10. The information reproducing apparatus according to claim 7 further comprising:
    an inhibiting section configured to inhibit an interruption of combined information reproduction in a case where the combined information is being reproduced by said first reproducing section.

11. The information reproducing apparatus according to claim 7, wherein the network information comprises a server changing code with which change of a server, to which an access is made, is instructed and address of a server to which a new access is made, and said information reproducing apparatus further comprises a server changing section configured to change data indicating the server to which access is made and included in the network reference information in accordance with the network information.

12. The information reproducing apparatus according to claim 7, wherein the main information is information of described contents of a movie, and the sub-information is information of described commercial from a sponsor of said movie.

13. A first storage medium having program code instructions stored thereon when executed by a processor, said instructions comprising:

means for causing said processor to read main information, sub-information, network reference information and a control code from a second storage medium on which the main information, the sub-information, the network reference information indicating main information and a network server to which an access is made and indicating whether or not the main information and the network information are combined with each other and whether or not the sub-information and the network information are combined with each other and the control code for identifying the main information, the sub-information and the network reference information from one another are recorded;

means for causing said processor to acquire the network information from said network server in accordance with the read network reference information;

means for causing said processor to combine acquired network information and read sub-information with each other in a case where read network reference information indicates that the sub-information and the network information are combined with each other; and means for causing said processor to reproduce 14. An information reproducing apparatus comprising:

a reading section configured to read main information, sub-information, receiving program information, and a control code from an information recording medium on which the main information, the sub-information, the receiving program information which indicates a program to be received and with which the program which is received is specified and a control code for distinguishing the main information, the sub-information and the receiving program information from one another are recorded;

a receiving section configured to receive broadcast program information;

a selection section configured to select the broadcast program information received by said receiving section in accordance with the receiving program information read by said reading section;

a first determining section configured to determine whether or not the sub-information read by said reading section includes a broadcast information reference code; and a first reproducing section configured to reproduce the broadcast program information selected by said selection section in a case where said first determining section determines that the sub-information includes said broadcast information reference code.

15. The information reproducing apparatus according to claim 14, further comprising:

a second reproducing section configured to reproduce the sub-information read by said reading section in a case where said first determining section determines that sub-information does not include said broadcast information reference code.

16. The information reproducing apparatus according to claim 14, further comprising:

a second reproducing section configured to reproduce the sub-information read by said reading section;

a second determining section configured to determine whether or not said control code read by said reading section indicates the sub-information; and an inhibiting section configured to inhibit an interruption of sub-information reproduction reproduced by said second reproducing section in a case where said second determining section determines that said control code indicates the sub-information.

17. The information reproducing apparatus according to claim 14, wherein said information recording medium is a DVD.

18. The information reproducing apparatus according to claim 14, wherein the main information is information of described contents of a movie, and the sub-information is information of described commercial from a sponsor of said movie.

19. A first storage medium having program code instructions stored thereon when executed by a processor, said instructions comprising:

means for causing said processor to read main information, sub-information, receiving program information and a control code from an information recording medium on which the main information, the sub-information, the receiving program information which indicates a program to be received and with which the program which is received is specified and said control code for distinguishing the main information, the sub-information and the receiving program information from one another have been recorded;

means for causing said processor to select broadcast program information in accordance with read receiving program information;

means for causing said processor to determine whether read sub-information includes a broadcast information reference code; and means for causing said processor to reproduce selecting broadcast program information in a case where a determination is performed that the sub-information includes said broadcast information reference code.

20. An information reproducing apparatus comprising:

a reproducing section configured to reproduce main information and sub-information which are recorded on information recording medium; and an inhibiting section configured to inhibit an interruption of sub-information reproduction by said reproducing section.

21. An information reproducing method comprising:

reproducing main information and sub-information which are recorded on information recording medium; and preventing an interruption a request for of sub-information reproduction during the reproduction of the sub-information.

22. An information reproducing apparatus comprising:

a section configured to reproduce main information and sub-information which are recorded on an information recording medium;

a section configured to demand an interruption of sub-information reproduction by said reproducing section; and a section configured to ignore the interruption during sub-information reproduction by said reproducing section.

23. An information reproducing apparatus according to claim 1, wherein the interruption of sub-information reproduction is inhibited when an instruction for fast forward movement is input from a user while reproducing the sub-information.

24. A first storage medium according to claim 6, wherein the interruption of sub-information reproduction is inhibited when an instruction for fast forward movement is input from a user while reproducing the sub-information.

25. An information reproducing apparatus according to claim 20, wherein the interruption of sub-information reproduction is inhibited when an instruction for fast forward movement is input from a user while reproducing the sub-information.

26. An information reproducing method according to claim 21, wherein the interruption of sub-information reproduction is ignored when an instruction for fast forward movement is input from a user while reproducing the sub-information.

27. An information reproducing apparatus according to claim 22, wherein the interruption of sub-information reproduction is ignored when an instruction for fast forward movement is input from a user while reproducing the sub-information.

28. An information reproducing apparatus comprising:

a firt section configured to read main information, sub-information and network reference information indicating a network server for providing latest sub-information from a first source comprising an information recording medium;

a second section configured to acquire the latest sub-information from a second source external to said first source comprising the network server based on the read network reference information; and a third section configured to reproduce the acquired latest sub-information from said second section with at least one of the read main information and sub-information from said information recording medium.

29. An information reproducing apparatus comprising:

a first section configured to read main information and receiving program information indicating a broadcast program, with regard to sub-information, to be selected from a first source comprising an information recording medium;

a second section configured to receive broadcast programs from a second source external to said first source comprising a broadcasting station;

a third section configured to select a broadcast program from the received broadcast programs based on the read receiving program information; and a fourth section configured to reproduce the read main information from said information recording medium with the selected broadcast program from said second section.

30. An information reproducing apparatus comprising:

a first section configured to read information to be reproduced and network reference information indicating a network server for providing latest advertisement information from a first source comprising an information recording medium;

a second section configured to acquire the latest advertisement information from a second source external to said first source comprising the network server based on the read network reference information; and a third section configured to reproduce the acquired latest advertisement information from said second section with the read information to be reproduced from said information recording medium.

31. An information reproducing apparatus comprising:

a first section configured to read information to be reproduced and receiving program information indicating a broadcast program, with regard to advertisement information, to be selected from a first source comprising an information recording medium;

a second section configured to receive broadcast programs from a second source external to said first source comprising a broadcasting station;

a third section configured to select a broadcast program from the received broadcast programs based on the read receiving program information; and a fourth section configured to reproduce the read information to be reproduced from said information recording medium with the selected broadcast program from said second section.

* * * * *